US012700911B2

(12) United States Patent
Li et al.

(10) Patent No.: US 12,700,911 B2
(45) Date of Patent: Aug. 4, 2026

(54) METHOD OF ADAPTING BETWEEN BEAM MANAGEMENT STATES IN FR2

(71) Applicant: TELEFONAKTIEBOLAGET LM ERICSSON (PUBL), Stockholm (SE)

(72) Inventors: Ming Li, Stockholm (SE); Joakim Axmon, Limhamn (SE); Muhammad Ali Kazmi, Sundbyberg (SE); Thomas Chapman, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 86 days.

(21) Appl. No.: 18/681,839

(22) PCT Filed: Aug. 5, 2022

(86) PCT No.: PCT/IB2022/057291
§ 371 (c)(1),
(2) Date: Feb. 6, 2024

(87) PCT Pub. No.: WO2023/012734
PCT Pub. Date: Feb. 9, 2023

(65) Prior Publication Data
US 2025/0141532 A1     May 1, 2025

Related U.S. Application Data

(60) Provisional application No. 63/230,392, filed on Aug. 6, 2021.

(51) Int. Cl.
*H04B 7/08*     (2006.01)

(52) U.S. Cl.
CPC .................................. *H04B 7/088* (2013.01)

(58) Field of Classification Search
CPC ....................................................... H04B 7/088
See application file for complete search history.

(56) References Cited

U.S. PATENT DOCUMENTS

| | | | |
|---|---|---|---|
| 12,089,065 B2* | 9/2024 | Awada ................... | H04W 16/26 |
| 2019/0097703 A1* | 3/2019 | Nilsson ................ | H04B 7/0617 |
| 2019/0158162 A1* | 5/2019 | Ryu ........................ | H04B 7/088 |
| 2022/0386294 A1* | 12/2022 | Xu ........................ | H04W 72/046 |
| 2022/0408275 A1* | 12/2022 | Awada ................... | H04W 16/26 |
| 2023/0269609 A1* | 8/2023 | Wang .................... | H04W 72/54 |
| | | | 370/328 |
| 2023/0283348 A1* | 9/2023 | MolavianJazi .... | H04B 7/06952 |
| 2025/0141532 A1* | 5/2025 | Li ........................... | H04B 7/088 |

* cited by examiner

*Primary Examiner* — Jaison Joseph

(57) ABSTRACT

A method performed by a user equipment (UE) for switching between a first state for beam management and a second state for beam management includes determining whether to change from the first state to the second state based on one or more first criteria while operating in the first state or determining whether to change from the second state to the first state based on one or more second criteria while operating in the second state. The method includes responsive to determining to change from the first state to the second state: changing the UE to operating in the second state; and performing at least one action in the second state. The method includes responsive to determining to change from the second state to the first state: changing the UE to operating in the first state.

21 Claims, 10 Drawing Sheets

NORMAL STATE      ENHANCED STATE

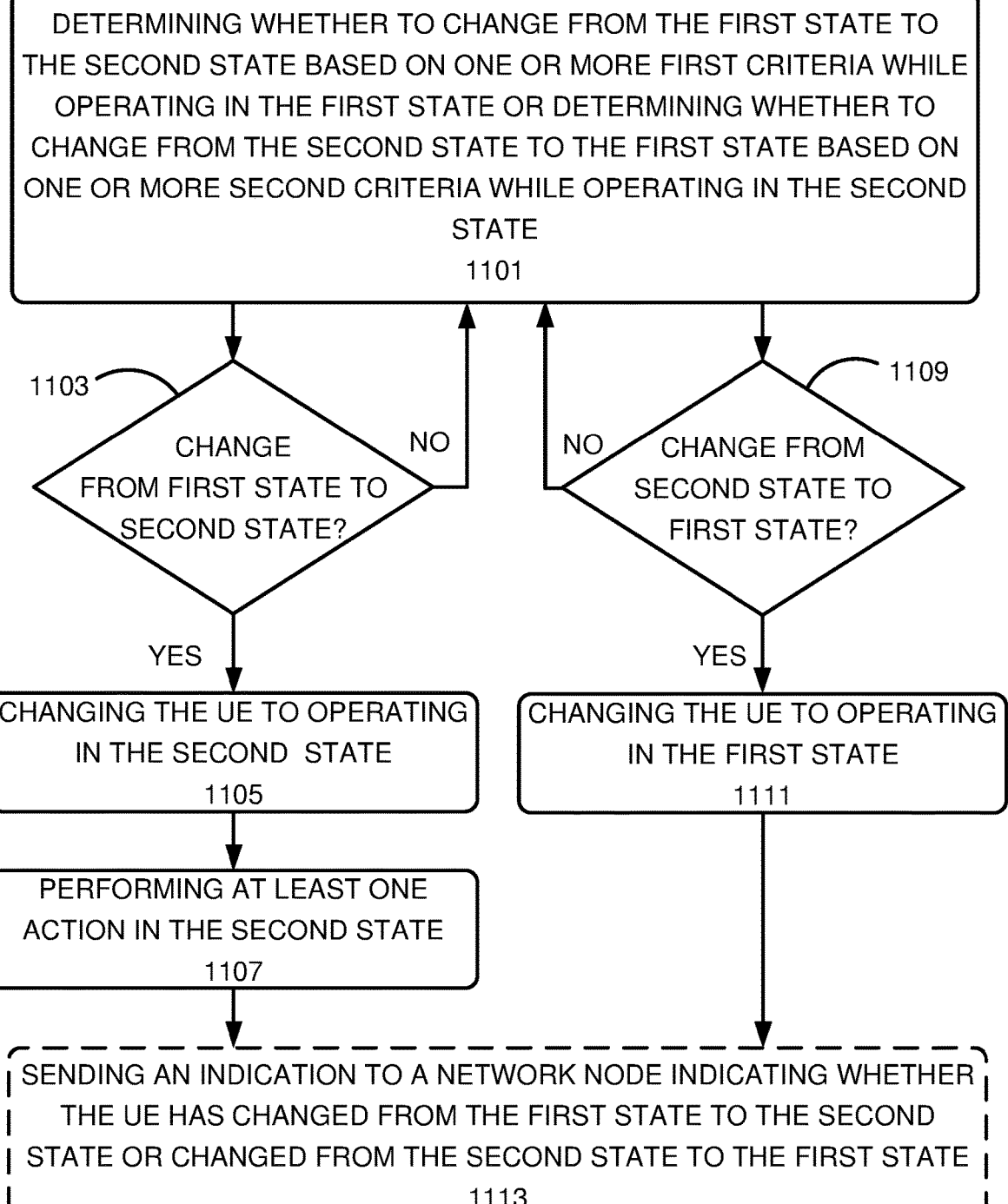

DETERMINING WHETHER TO CHANGE FROM THE FIRST STATE TO THE SECOND STATE BASED ON ONE OR MORE FIRST CRITERIA WHILE OPERATING IN THE FIRST STATE OR DETERMINING WHETHER TO CHANGE FROM THE SECOND STATE TO THE FIRST STATE BASED ON ONE OR MORE SECOND CRITERIA WHILE OPERATING IN THE SECOND STATE
1101

1103

CHANGE FROM FIRST STATE TO SECOND STATE?     NO

1109

NO     CHANGE FROM SECOND STATE TO FIRST STATE?

YES

CHANGING THE UE TO OPERATING IN THE SECOND STATE
1105

YES

CHANGING THE UE TO OPERATING IN THE FIRST STATE
1111

PERFORMING AT LEAST ONE ACTION IN THE SECOND STATE
1107

SENDING AN INDICATION TO A NETWORK NODE INDICATING WHETHER THE UE HAS CHANGED FROM THE FIRST STATE TO THE SECOND STATE OR CHANGED FROM THE SECOND STATE TO THE FIRST STATE
1113

Figure 11

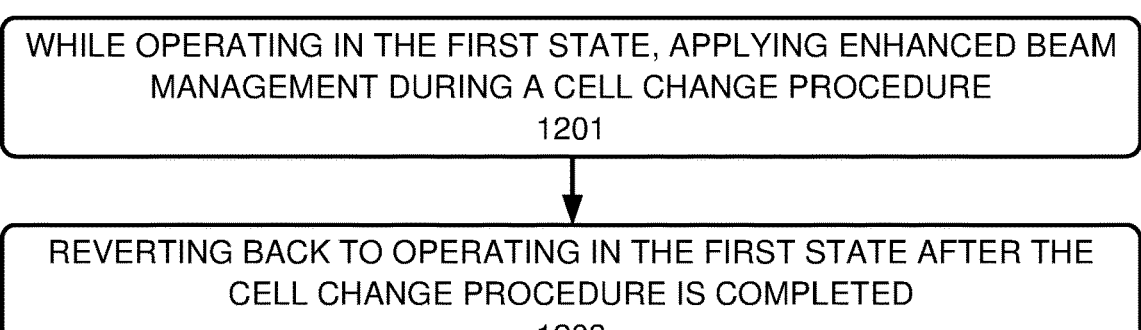

WHILE OPERATING IN THE FIRST STATE, APPLYING ENHANCED BEAM
MANAGEMENT DURING A CELL CHANGE PROCEDURE
1201

REVERTING BACK TO OPERATING IN THE FIRST STATE AFTER THE
CELL CHANGE PROCEDURE IS COMPLETED
1203

Figure 12

RESPONSIVE TO RECEIVING A COMMAND TO CHANGE TO THE
SECOND STATE WHILE OPERATING IN THE FIRST STATE, CHANGING
FROM THE FIRST STATE TO THE SECOND STATE
1301

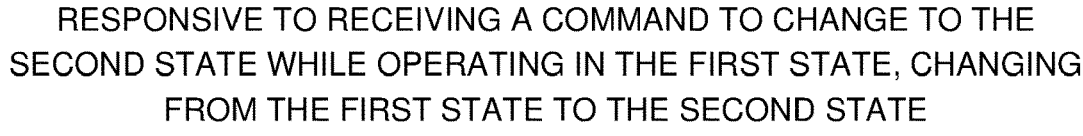

RESPONSIVE TO RECEIVING A COMMAND TO CHANGE TO THE FIRST
STATE WHILE OPERATING IN THE SECOND STATE, CHANGING FROM
THE SECOND STATE TO THE FIRST STATE
1303

Figure 13

RECEIVING INFORMATION FROM A UE INDICATING THAT THE UE HAS
SWITCH FROM A FIRST STATE FOR BEAM MANAGEMENT TO A SECOND
STATE FOR BEAM MANAGEMENT OR FROM THE SECOND STATE TO
THE FIRST STATE
1401

RESPONSIVE TO RECEIVING THE INFORMATION, PERFORMING ONE
OR MORE TASKS BASED ON WHETHER THE UE HAS SWITCHED FROM
THE FIRST STATE TO THE SECOND STATE OR FROM THE SECOND
STATE TO THE FIRST STATE
1403

Figure 14

METHOD OF ADAPTING BETWEEN BEAM MANAGEMENT STATES IN FR2

This application is a national phase application of International Patent Application No. PCT/IB2022/057291, filed Aug. 5, 2022, which claims the benefit of U.S. Provisional Patent Application No. 63/230,392, filed Aug. 6, 2021, the disclosure of which are hereby incorporated herein by reference in their entirety.

TECHNICAL FIELD

Background

High Speed Train (HST) Operation

During Release 16, 3GPP RAN4 ($3^{rd}$ Generation Partnership Project Radio Access Network 4) created RF (radio frequency) and RRM (radio resource management) requirements for operation of NR (new radio) for high speed trains (HST) in Frequency Range 1 (FR1). The specification of FR1 HST followed specification of E-UTRA (Evolved-Universal Terrestrial Radio Access) High Speed Train (HST). During Release 17, 3GPP have approved a RAN4 Work Item for the development of specifications for RF, RRM and demodulation enabling serving High Speed Trains using FR2, and in particular the bands around 28 GHz. FR1 and FR2 differs in that the frequencies in FR1 are lower than those in FR2. For example, FR1 may comprise frequencies between 400 MHz to 7 GHz, and FR1 may comprise frequencies between 24 GHz and 52.6 GHz. In another example FR2 may comprise frequencies between 24 GHz and 71 GHz. In yet another example FR2 may comprise frequencies at least from 24 GHz and above. Another key difference between FR1 and FR2 is that for FR2, beamforming is assumed to be performed at both the BS (base station) and the UE (user equipment), whereas for FR1 at least the UE is generally assumed to be omni-directional, and when deriving HST requirements the BS is assumed to have a fixed antenna pattern.

For a high-speed train operation, base stations are typically placed along the track with a certain interval in between. For FR2, UEs are assumed to be devices fixed to the roof of the train, which further provide service to users inside of the train. RRM algorithms are specified such that the network is aware of the base station(s) which are best placed to serve the UE and operates TCI (transmission control indication) state change or handover between the base stations as the train moves along the track.

There are two example deployment parameters shown below in FIG. 1 and Table 1 used in 3GPP. Other deployment parameters may be used, such as antenna direction, train direction, etc.

Ds is the distance between two RRHs (remote radio heads).

Dmin is the straight-line distance from RRH to rail track.

According to different values of Dmin, Scenario A and Scenario B are defined in Table 1.

| Parameter | Scenario A | Scenario B |
|---|---|---|
| Dmin | 10 m | 150 m |
| Ds | 700 m | 700 m |

Radio link monitoring (RLM) is a mechanism for a UE to monitor the quality of a downlink (DL) for determining if the radio link is good enough to continue transmission.

Through RLM, UE shall consider radio link failure (RLF) to be detected. The UE is expected to monitor the RS in the downlink. Based on the signal strength of the Reference Signals (i.e., the RSRP), the UE will determine if it can decode the PDCCH based on a certain set of parameters that are provided in the specs. Each UE will have a different RSRP threshold in which it will assume it cannot read the PDCCH. If the Reference signals have enough strength such that the UE can decode consistently the PDCCH, then the link is In-Synch.

Radio Link Monitor and Radio Link Failure

Radio link monitoring (RLM) is a mechanism for a UE to monitor the quality of a downlink (DL) for determining if the radio link is good enough to continue transmission. Through RLM, UE shall consider radio link failure (RLF) to be detected. The UE is expected to monitor the RS (reference signal) in the downlink. Based on the signal strength of the Reference Signals (i.e., the RSRP (reference signal received power), the UE will determine if it can decode the PDCCH (physical downlink control channel) based on a certain set of parameters that are provided in the specs. Each UE will have a different RSRP threshold in which it will assume it cannot read the PDCCH. If the Reference signals have enough strength such that the UE can decode consistently the PDCCH, then the link is In-Synch.

The full procedure for determining if the link has failed due to being out of sync is defined with three parameters shown:

n310: This parameter indicates certain intervals defined by RRC (radio resource control) when the UE is unable to successfully decode the PDCCH due to low RSRP detected. That is, this parameter indicates the number of times in which the UE cannot successfully decode 20 consecutive frames in the downlink.

t310: This is a timer defined by RRC used to allow the UE to get back in synchronization with the eNodeB.

n311: This parameter indicates certain intervals defined by RRC that the UE must successfully decode the PDCCH to be back in-synch with the eNodeB. That is, this parameter indicates the number of times in which the UE must successfully decode 10 consecutive frames in the downlink in order for the UE to assume the radio link is in-synch.

In an example, if the UE detects n310 consecutive out-of-sync indications, the UE starts the t310 timer. If the timer expires, the link has failed. If the UE detects n311 consecutive in-sync indications prior to the t310 timer expiring, then the timer is stopped, and the link has not failed.

Transmission Configuration Indication (TCI)

A UE is configured by the network node with one active TCI (transmission configuration indication) state for channel reception of e.g., PDCCH (physical downlink control channel) and PDSCH (physical downlink shared channel), respectively. The active TCI indicates, for each of the channels, the timing reference the UE shall assume for the downlink reception. The timing reference is defined with respect to a certain downlink reference signal (RS). Examples of RS are SSB (synchronization signal block), CSI-RS (channel state indication-reference signal), DM-RS (demodulation reference signal), PRS (position reference signal) etc. For example, the timing reference may be with respect to an SSB index associated with a particular transmit beam, or with respect to CSI-RS resource configured by the network node and provided (i.e., transmitted) to the UE.

The DL (downlink) RS (e.g., SSB, CSI-RS) may interchangeably be called as a DL beam, spatial filter, spatial domain transmission filter, main lobe of the radiation pattern of antenna array etc. Therefore, the active TCI state additionally indicates to the UE which UE Rx (receive) beam to use when receiving PDCCH and/or PDSCH, since it shall use the UE receive (RX) beam that allows best conditions for receiving the SSB index or DL-RS resource associated with the TCI state. The best UE RX beam for a given TCI state may change over time, for example, if the UE orientation changes, but also has to be relatively static at least over short time intervals.

The RS or beams may be addressed or configured by an identifier, which can indicate the location of the beam in time in beam pattern e.g., beam index such as SSB index indicate SSB beam location in the pre-defined SSB format/pattern.

Beam Management Procedure

The beam management is a procedure to maintain the beam connection for transmission and reception. The beam management is also interchangeably called as link recovery procedure. The beam management broadly comprises one or more of beam related procedures e.g., beam establishment, beam failure detection, beam failure recovery and beam indication (or beam reporting). These are described below.

The UE measures the channel quality of the periodic reference signal (RS) e.g., SS/PBCH (physical broadcast channel) block and/or CSI-RS resources) in a serving cell. If the measured quality is below the threshold, corresponding to hypothetical PDCCH BLER (block error rate) of 10%, then the UE physical layer indicates beam failure to the MAC (medium access control) layer. This event is called as beam failure detection (BFD). The BFD is done over BFD evaluation period. In frequency range 2 (FR2) (e.g., mmwave etc.), the BFD evaluation period additionally applies Rx beam sweeping factor, N, where it is assumed UE tries to receive RLM-RS (radio link monitoring-reference signal) with different Rx beam configuration to measure the BFD-RS. Example of N is 8. Therefore, BFD evaluation period includes N as multiplier.

After BFD, the UE searches for candidate beams from the configured RS (e.g., CSI-RS and/or SS/PBCH block resources) for candidate beam detection in the serving cell. The UE determines one of the beams in the configured set of RS whose L1-RSRP exceeds certain threshold which is signaled by the network. L1-RSRP is measured over L1-RSRP evaluation period or measurement period. This procedure is called as candidate beam detection (CBD). In FR2, the CBD evaluation period additionally applies Rx beam sweeping factor, N, where it is assumed UE tries to receive CBD-RS with different Rx beam configuration to measure the CBD-RS. Example of N is 8. Therefore, L1-RSRP evaluation period includes N as multiplier.

After determining the new beam in the serving cell, the UE reports the selected beam with the random access procedure, where the UE transmits random access preamble on the PRACH (physical random access channel) corresponding to the SS/PBCH block and/or CSI-RS resource. After determining the new beam in SCell, UE reports the selected beam with the Beam failure recovery (BFR) message in MAC CE (control element).

L1-RSRP reporting is a part of the CSI reporting procedure. The UE reports the L1-RSRP (e.g., received power of the measured beams out of the configured number beams to the network. The network uses the information to determine which beam is to be used to transmit data (PDCCH/PDSCH). L1-RSRP reporting is configured as periodic, aperiodic, or semi-persistent. In FR2, the L1-RSRP measurement period additionally applies Rx beam sweeping factor, N, where it is assumed UE tries to receive SSB with different Rx beam configuration to measure the SSB. Example of N is 8.

Similar to L1-RSRP reporting, L1-SINR (L1-signal interference to noise ratio) reporting is also a part of the CSI reporting procedure and the UE reports the ratio of received power of the channel measurement resources (CMR) and received power of the interference measurement resource (IMR). 3GPP assumes CMR is SSB or CSI-RS, and IMR is Non-zero-power CSI-RS (NZP-CSI-RS) or zero-power CSI-RS (ZP-CSI-RS). In FR2, the L1-SINR measurement period additionally applies Rx beam sweeping factor, N, where it is assumed UE tries to receive SSB and IMR with different Rx beam configuration to measure the SSB and IMR. Example of N is 8. Both L1-RSRP and L1-SINR reporting are part of beam indication or beam reporting.

There currently exist certain challenge(s). Referring to 3GPP 38.133 V17.2.0, evaluation periods of RLM and BFD for legacy NR operation are defined as follows:

TABLE 8.1.2.2-2

Evaluation period $T_{Evaluate\_out\_SSB}$ and $T_{Evaluate\_in\_SSB}$ for FR2

| Configuration | $T_{Evaluate\_out\_SSB}$ (ms) | $T_{Evaluate\_in\_SSB}$ (ms) |
|---|---|---|
| no DRX | Max(200, Ceil(10 ' P ' N) ' $T_{SSB}$) | Max(100, Ceil(5 ' P ' N) ' $T_{SSB}$) |
| DRX cycle ≤ 320 ms | Max(200, Ceil(15 ' P ' N) ' Max($T_{DRX}$, $T_{SSB}$)) | Max(100, Ceil(7.5 ' P ' N) ' Max($T_{DRX}$, $T_{SSB}$)) |
| DRX cycle > 320 ms | Ceil(10 ' P ' N) ' $T_{DRX}$ | Ceil(5 ' P ' N) ' $T_{DRX}$ |

NOTE:
$T_{SSB}$ is the periodicity of the SSB configured for RLM.
$T_{DRX}$ is the DRX cycle length.

TABLE 8.5.2.2-2

Evaluation period TEvaluate_BFD_SSB for FR2

| Configuration | TEvaluate_BFD_SSB (ms) |
|---|---|
| no DRX | Max(50, Ceil(5 ' P ' N) ' $T_{SSB}$) |
| DRX cycle ≤ 320 ms | Max(50, Ceil(7.5 ' P ' N) ' Max(TDRX, $T_{SSB}$)) |
| DRX cycle > 320 ms | Ceil(5 ' P ' N) ' $T_{DRX}$ |

Note:
$T_{SSB}$ is the periodicity of SSB in the set $q_0$.
$T_{DRX}$ is the DRX cycle length.

Assuming a DRX cycle length of 80 ms and a scaling factor N=8 results in the following evaluation period lengths:

$T_{Evaluate\_in\_SSB}$=15×8×80 ms=9600 ms
$T_{Evaluate\_in\_SSB}$=7.5×8×80 ms=4800 ms
$T_{Evaluate\_BFD\_SSB}$=7.5×8×80 ms=4800 ms Scaling factor N=8 is used in order to be complaint with assumptions in the standard for facilitating analog beam sweeping/beam forming at the UE side.

With benefit from a fixed trajectory and dedicated UEs in the HST FR2 scenario, scaling factor can be reduced to a smaller number (e.g., 1 or 2 instead of 8) according to deployment studies. Reduced scaling factor can bring obvious low latency/delay benefits to mobility or signaling.

On the other hand, a quick recovery from RLF and BFD is essential to secure channel quality between RRH and UE in case of unpredicted abnormal situations. If RLF or BFD happens, or link quality degrades, it is expected to look for and switch to better beam configuration. Hence, how to improve efficient and quick recovery from link failure becomes a very important issue that needs to be solved.

SUMMARY

The problem is that these two issues, latency reduction by means of reduced scaling factor N and quick recovery from link failure, respectively, are in conflict; for most of the time the UE does not need to operate with a scaling factor of N=8 and can benefit from reduced and faster measurements. However, if the scaling factor is reduced the performance will be impacted when RLF or BFD occurs.

Certain aspects of the disclosure and their embodiments may provide solutions to these or other challenges. In various embodiments of inventive concepts, the UE uses more than one beam management mechanisms (a first state such as normal state/mode and a second state such as an enhanced state/mode), where the more than one beam management mechanisms differ by additional or updated beam sweeping, when the UE is in a high speed environment e.g., HST FR2 deployment. The beam management mechanism to be applied is determined based on a set of criteria that relate to the UE's current state. The UE switches or transitions between the first state and the second state, e.g., the normal beam management state and enhanced beam management states, when one or more criteria are met. For example, in a normal state, the UE may apply or use K1 number of RX beams for beamsweeping and in enhanced state, the UE may apply or use K2 number of RX beams for beam sweep where K1≠K2 e.g., K2>K1. The UE in some embodiments may also indicate the network when it switches between the two states.

According to some embodiments, a method performed by a user equipment, UE, for switching between a first state for beam management and a second state for beam management includes determining whether to change from the first state to the second state based on one or more first criteria while operating in the first state or determining whether to change from the second state to the first state based on one or more second criteria while operating in the second state. The method includes responsive to determining to change from the first state to the second state: changing the UE to operating in the second state and performing at least one action in the second state. The method includes responsive to determining to change from the second state to the first state: changing (1111) the UE to operating in the first state.

Analogous UEs, computer programs, and computer program products are also provided in some embodiments.

According to some other embodiments, a method performed by a network node for performing tasks based on a user equipment, UE, switching between a first state for beam management and a second state for beam management includes receiving information from a user equipment, UE, indicating that the UE has switched from a first state for beam management to a second state for beam management or from the second state to the first state. The method includes responsive to receiving the information, performing one or more tasks based on whether the UE has switched from the first state to the second state or from the second state to the first state.

Analogous network nodes, computer programs, and computer program products are also provided in some embodiments.

Certain embodiments may provide one or more of the following technical advantage(s). Advantages that may be achieved with the various embodiments of flexible beam management mechanisms based on specific characteristics of HST FR2 deployment, which can replace or supplement current RLM and BFD procedure to secure both link quality with quick recovery time and high success rate together, instead of having to optimize for either the one or the other.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 9-13 are flow charts illustrating operations of a user equipment according to some embodiments of inventive concepts;

FIG. 14 is a flow chart illustrating operations of a network node according to some embodiments of inventive concepts;

DETAILED DESCRIPTION

Figure 1:
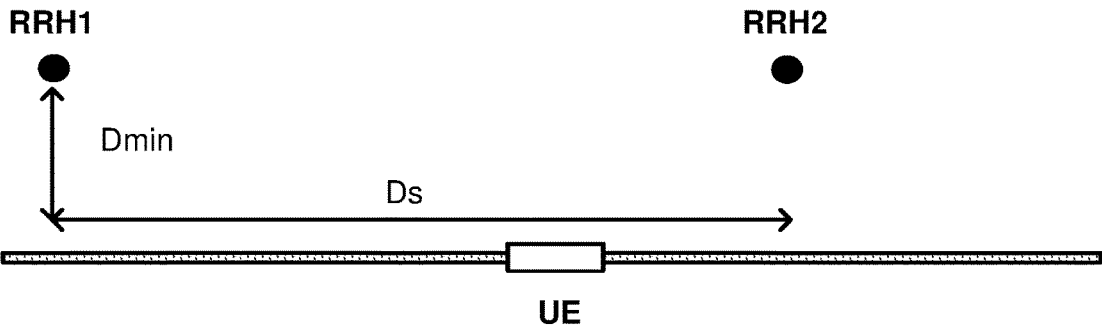
FIG. 1 is an illustration of RRH deployment parameters.
Figure 2:
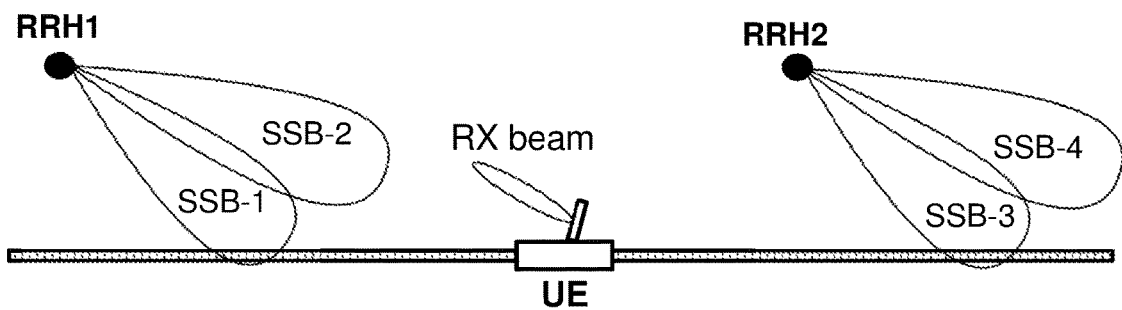
FIG. 2 is an illustration of Uni-directional operation in HST-FR2.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

According to a first embodiment of inventive concepts, the UE has two states for beam management. These are termed normal and enhanced states. In the description that follows the normal state may be interchangeably termed first state and the enhanced state may be interchangeably termed second state. The UE may be configured to check one or more criteria for deciding whether to change from running beam management in normal state to beam management in enhanced state. The UE may further be configured with one or more criteria which the UE is required to evaluate. The one or more criteria may be pre-defined. The one or more criteria may include time instance over which the measured L1-RSRP is below a configured threshold or a provided hypothetical error rate of PDCCH. Furthermore, one or more timers whose lengths may be predefined may be included in criteria definitions.

A further type of criteria could consist of position information indicating the UE location or position along a train track. This could be provided to the UE by one or more of: a positioning system (e.g., GPS), by information provided to the UE from the train operation system, and by an estimation based on the train speed and elapsed time.

One or more criteria are checked by the UE when the UE changes from enhanced state to normal state e.g. based a timer only or time instance over which the measured L1-RSRP is below a configured threshold or based on signal quality (e.g., a hypothetical error rate of PDCCH) etc.

According to a second embodiment of inventive concepts, the UE implements beam management enhancement to gain extra or wider angular or spherical coverage with increased or updated beam sweeping after entering enhanced mode when one or more criteria are fulfilled. Beam management can be operation on at least one of SSB, CSI-RS, and any reference signal that is used for RLM or BFD and responding RX beams. CSI-RS and any reference signals which are used for RLM and BFD. After identifying a suitable beam configuration, UE can return to normal beam sweeping state, i.e., same as before entering enhanced state.

According to a third embodiment of inventive concepts, the UE is configured (e.g., pre-defined or configured by the network node) to remain or stay in certain state while performing certain radio link procedure(s) (e.g., cell change, TCI state switching etc). For example, the UE may be configured to apply enhanced beam management during the cell change procedure and may revert to normal state after the cell change procedure is completed.

According to a fourth embodiment the UE transmits information to the network node indicating whether the UE has performed switching between the two states for beam management e.g., from normal to enhanced or vice versa. The network node may use the received information for performing one or more operations or tasks.

According to a fifth embodiment of inventive concepts, the network node upon determining that the UE has performed switching between the two states for beam management (e.g., from normal to enhanced or vice versa), may perform one or more operations. In one example the network node may configure the UE to perform TCI state switching. In another example the network node may configure the UE to perform cell change to a target cell. In another example the network node may configure the UE to perform cell change to a target cell only when the UE has switched from normal state to enhanced state. In a further example, the network node assess the one or more criteria and sends an indication to the UE to switch states, implement beam management enhancement during cell changes, etc.

Figure 8:
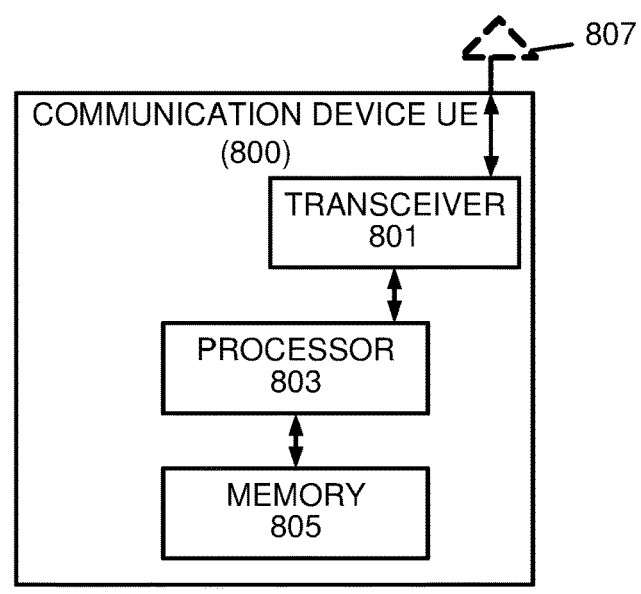
FIG. 8 is a block diagram illustrating a wireless device UE according to some embodiments of inventive concepts.

Prior to describing further embodiments of inventive concepts, FIG. 8 is a block diagram illustrating elements of a communication device UE 800 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 800 may be provided, for example, as discussed below with respect to wireless devices UE 1512A, UE 1512B, and wired or wireless devices UE 1512C, UE 1512D of FIG. 15, UE 1600 of FIG. 16, virtualization hardware 1904 and virtual machines 1908A, 1908B of FIG. 19, and UE 2006 of FIG. 20, all of which should be considered interchangeable in the examples and embodiments described herein and be within the intended scope of this disclosure, unless otherwise noted.) As shown, communication device UE may include an antenna 807 (e.g., corresponding to antenna 1622 of FIG. 16), and transceiver circuitry 801 (also referred to as a transceiver, e.g., corresponding to interface 1612 of FIG. 16 having transmitter 1618 and receiver 1620) including a transmitter and a receiver configured to provide uplink and downlink radio communications with a base station(s) (e.g., corresponding to network node 1510A, 1510B of FIG. 15, network node 1700 of FIG. 17, and network node 2004 of FIG. 20 also referred to as a RAN node) of a radio access network. Communication device UE may also include processing circuitry 803 (also referred to as a processor, e.g., corresponding to processing circuitry 1602 of FIG. 16, and control system 1912 of FIG. 19) coupled to the transceiver circuitry, and memory circuitry 805 (also referred to as memory, e.g., corresponding to memory 1610 of FIG. 15) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that separate memory circuitry is not required. Communication device UE may also include an interface (such as a user interface) coupled with processing circuitry 803, and/or communication device UE may be incorporated in a vehicle.

As discussed herein, operations of communication device UE may be performed by processing circuitry 803 and/or transceiver circuitry 801. For example, processing circuitry 803 may control transceiver circuitry 801 to transmit communications through transceiver circuitry 801 over a radio interface to a radio access network node (also referred to as a base station) and/or to receive communications through transceiver circuitry 801 from a RAN node over a radio interface. Moreover, modules may be stored in memory circuitry 805, and these modules may provide instructions so that when instructions of a module are executed by processing circuitry 803, processing circuitry 803 performs respective operations (e.g., operations discussed below with respect to Example Embodiments relating to wireless communication devices). According to some embodiments, a communication device UE 800 and/or an element(s)/function(s) thereof may be embodied as a virtual node/nodes and/or a virtual machine/machines.

Figure 3:
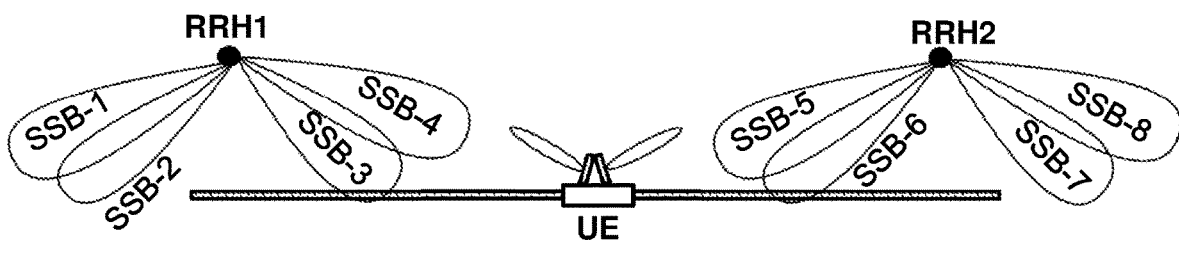
FIG. 3 is an illustration of Bi-directional operation in HST-FR2.
Figure 9:
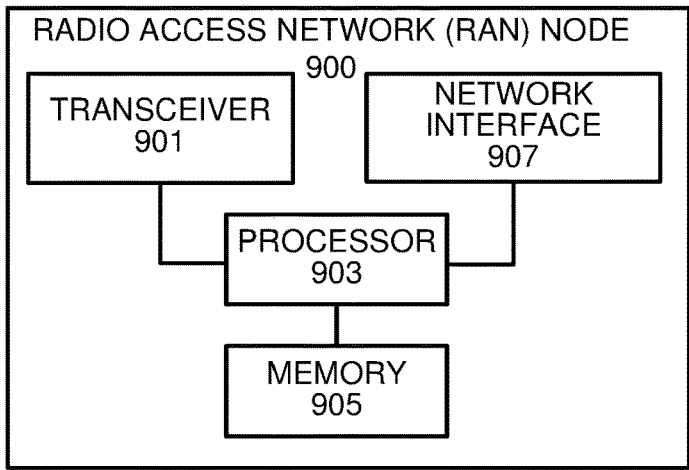
FIG. 9 is a block diagram illustrating a radio access network RAN node (e.g., a base station eNB/gNB) according to some embodiments of inventive concepts.

FIG. 9 is a block diagram illustrating elements of a radio access network RAN node 900 (also referred to as a network node, base station, eNodeB/eNB, gNodeB/gNB, etc.) of a Radio Access Network (RAN) configured to provide cellular communication according to embodiments of inventive concepts. (RAN node 900 may be provided, for example, as discussed below with respect to network node 1510A, 1510B of FIG. 15, network node 1700 of FIG. 3, hardware 1904 or virtual machine 1908A, 1908B of FIG. 19, and/or base station 2004 of FIG. 20, all of which should be considered interchangeable in the examples and embodiments described herein and be within the intended scope of this disclosure, unless otherwise noted.) As shown, the RAN node may include transceiver circuitry 901 (also referred to as a transceiver, e.g., corresponding to portions of RF transceiver circuitry 1712 and radio front end circuitry 1718 of FIG. 17) including a transmitter and a receiver configured to provide uplink and downlink radio communications with mobile terminals. The RAN node may include network interface circuitry 907 (also referred to as a network interface, e.g., corresponding to portions of communication interface 1706 of FIG. 17) configured to provide communications with other nodes (e.g., with other base stations) of the RAN and/or core network CN. The network node may also include processing circuitry 903 (also referred to as a processor, e.g., corresponding to processing circuitry 1702 of FIG. 17) coupled to the transceiver circuitry, and memory circuitry 1005 (also referred to as memory, e.g., corresponding to memory 1704 of FIG. 17) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the RAN node may be performed by processing circuitry 903, network interface 1007, and/or transceiver 901. For example, processing circuitry 903 may control transceiver 901 to transmit downlink communications through transceiver 901 over a radio interface to one or more mobile terminals UEs and/or to receive uplink communications through transceiver 901 from one or more mobile terminals UEs over a radio interface. Similarly, processing circuitry 903 may control network interface 907 to transmit communications through network interface 907 to one or more other network nodes and/or to receive communications through network interface from one or more other network nodes. Moreover, modules may be stored in memory 905, and these modules may provide instructions so that when instructions of a module are executed by processing circuitry 903, processing circuitry 903 performs respective operations (e.g., operations discussed below with respect to Example Embodiments relating to RAN nodes). According to some embodiments, RAN node 900 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node).

According to embodiments where the network node is a RAN node including a transceiver, initiating transmission may include transmitting through the transceiver.

Figure 10:
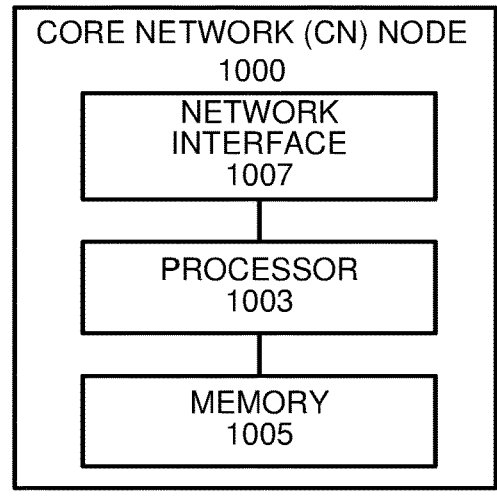
FIG. 10 is a block diagram illustrating a core network CN node (e.g., an AMF node, an SMF node, etc.) according to some embodiments of inventive concepts.

FIG. 10 is a block diagram illustrating elements of a core network (CN) node (e.g., an SMF (session management function) node, an AMF (access and mobility management function) node, etc.) of a communication network configured to provide cellular communication according to embodiments of inventive concepts. (CN node 1000 may be provided, for example, as discussed below with respect to core network node 1508 of FIG. 15, hardware 1904 or virtual machine 1908A, 1908B of FIG. 19, all of which should be considered interchangeable in the examples and embodiments described herein and be within the intended scope of this disclosure, unless otherwise noted) As shown, the CN node may include network interface circuitry 1007 configured to provide communications with other nodes of the core network and/or the radio access network RAN. The CN node may also include a processing circuitry 1003 (also referred to as a processor) coupled to the network interface circuitry, and memory circuitry 1005 (also referred to as memory) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the CN node may be performed by processing circuitry 1003 and/or network interface circuitry 1007. For example, processing circuitry 1003 may control network interface circuitry 1007 to transmit communications through network interface circuitry 1007 to one or more other network nodes and/or to receive communications through network interface circuitry from one or more other network nodes. Moreover, modules may be stored in memory 1005, and these modules may provide instructions so that when instructions of a module are executed by processing circuitry 1003, processing circuitry 1003 performs respective operations (e.g., operations discussed below with respect to Example Embodiments relating to core network nodes). According to some embodiments, CN node 1000 and/or an element(s)/function(s) thereof may be embodied as a virtual node/nodes and/or a virtual machine/machines.

In the description that follows, the term "network node" shall be used. Various network nodes have been described above in FIG. 9. Other examples of network nodes include NodeB, base station (BS), multi-standard radio (MSR) radio node such as MSR BS, eNodeB, gNodeB, MeNB, SeNB, location measurement unit (LMU), integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, transmission reception point (TRP), RRU, RRH, nodes in distributed antenna system (DAS), core network node (e.g. MSC, MME etc), O&M, OSS, SON, positioning node (e.g. E-SMLC), etc.

The term "UE" has been described above with respect to FIG. 8. Other examples of UE refer to any type of wireless device communicating with a network node and/or with another UE in a cellular or mobile communication system. Examples of UE are target device, device to device (D2D) UE, vehicular to vehicular (V2V), machine type UE, MTC UE or UE capable of machine to machine (M2M) communication, PDA, tablet, mobile terminals, smart phone, laptop embedded equipment (LEE), laptop mounted equipment (LME), USB dongles etc.

The term radio access technology, or RAT, may refer to any RAT e.g., UTRA, E-UTRA, narrow band internet of things (NB-IoT), WiFi, Bluetooth, next generation RAT, New Radio (NR), 4G, 5G, etc. Any of the equipment denoted by the term node, network node or radio network node may be capable of supporting a single or multiple RATs.

The term signal or radio signal used herein can be any physical signal or physical channel. Examples of DL physical signals are reference signal (RS) such as PSS (primary synchronization signal), SSS (secondary synchronization signal), CSI-RS, DMRS signals in SS/PBCH block (SSB), discovery reference signal (DRS), CRS, PRS etc. RS may be periodic e.g., RS occasion carrying one or more RSs may occur with certain periodicity e.g., 20 ms, 40 ms etc. The RS may also be aperiodic. Each SSB carries NR-PSS, NR-SSS and NR-PBCH in 4 successive symbols. One or multiple SSBs are transmit in one SSB burst which is repeated with certain periodicity e.g., 5 ms, 10 ms, 20 ms, 40 ms, 80 ms and 160 ms. The UE is configured with information about SSB on cells of certain carrier frequency by one or more SS/PBCH block measurement timing configuration (SMTC) configurations. The SMTC configuration comprising parameters such as SMTC periodicity, SMTC occasion length in time or duration, SMTC time offset wrt reference time (e.g., serving cell's SFN) etc. Therefore, SMTC occasion may also occur with certain periodicity e.g., 5 ms, 10 ms, 20 ms, 40 ms, 80 ms and 160 ms. Examples of UL physical signals are reference signal such as SRS, DMRS etc. The term physical channel refers to any channel carrying higher layer information e.g., data, control etc. Examples of physical channels are PBCH, NPBCH, PDCCH, PDSCH, sPUCCH, SPDSCH, sPUCCH, sPUSCH, MPDCCH (MTC PDCCH), NPDCCH, NPDSCH, E-PDCCH, PUSCH, PUCCH, NPUSCH etc.

Scenario Description

The terms, first state (e.g., "normal state") and second state (e.g., "enhanced state") of UE differ in terms of one or more parameters associated with the beam management or beam characteristics of the beam used by the UE for receiving signal from a radio node e.g., base station, RRH etc. Beam management may also be referred to as link recovery procedure, which may comprise beam failure detection (BFD) and candidate beam detection (CBD). Examples of parameters associated with the beam management or beam characteristics are number of RX beams or number of RX beam sweeps, direction of RX beam or direction of beam sweep, beamwidth, beam quality or range etc. The beamwidth may be expressed in degrees e.g., X1 degrees such as 15 degrees. The beam contains P1 dB or X2% of the power compared to the total power within the beamwidth e.g., P1=-3 dB. The beam quality or range may be expressed be expressed in terms of whether the RX beam is fine beam or rough beam. The fine beam and rough beam are associated with different RX antenna gain e.g., antenna gain for fine beam is Z dB larger than that for the rough beam e.g., fine beam and rough beam antenna gains are Z1 and Z2 dB respectively, where Z=Z1−Z2. The difference between the two states can be described with a few examples:

In one example, the UE uses K1 number of RX beams in the normal state and K2 number of RX beams in the enhanced state. K1≠K2. In one example K1<K2. In another example K1>K2.

In another example, the UE uses beamwidth of Y1 degrees for each RX beam in the normal state and Y2 degrees of beamwidth for each RX beam in the enhanced state. Y1≠Y2. In one example Y1<Y2. In another example Y1>Y2.

In another example, the UE uses fine beam for each RX beam in the normal state and rough beam for each RX beam in the enhanced state). In yet another example the UE uses rough beam for each RX beam in the first or normal state and fine beam for each RX beam in the enhanced state).

The normal state of UE may also be called as normal beam management state or mode, normal beamforming state or mode, normal beamsweeping state or mode etc. The enhanced state of UE may also be called as enhanced beam management state or mode, enhanced beamforming state or mode, enhanced beamsweeping state or mode etc.

Beam management enhancement is beam management operation after the UE enters the enhanced state.

Various embodiments of inventive concepts shall now be described.

Embodiment 1: UE Switching Between Normal and Enhanced States Based on One or More Criteria The UE is configured to switch between the normal state and the second (e.g., enhanced state when one or more criteria is met. The one or more criteria can be pre-defined, or they can be configured by the network node, e.g., via RRC messages. The UE is configured to perform the following two sets of transition/switching procedures:

1. Transitioning from normal state to enhanced state
2. Transitioning from enhanced state to normal state UE Switching or Transitioning from Normal State to Enhanced State In this procedure the UE is currently operating in normal state e.g., performing beamsweeping with K1 number of RX beams. When one or more criteria (as described below) is met then the UE switches to enhanced state e.g., start performing beamsweeping with K2 number of RX beams after the transition. The examples of criteria triggering the UE to switch to enhanced state are described below:

In one example the UE can be configured with a timer, T1, when the UE is in the normal state. T1 can be expressed in time units (e.g., ms, seconds, minutes etc) or time resources (e.g., slots, frames, SFN cycles, hyper SFN cycles etc). The UE starts T1 upon a triggering condition, the condition may certain L1-RSRP or switching to a new TCI state or entering a new cell, etc. In one example T1 starts when the UE enters in normal state. In another example the UE can be configured to start T1 anytime during the normal state. In another example the UE can be configured to start T1 when certain condition is met during the normal state e.g., when signal quality and/or signal strength fall below their respective thresholds etc. The expiration of timer T1 enables the UE to determine whether to change from normal state to enhanced state. However, the UE may also be configured to verify one or more additional conditions. This is explained with examples:

1. In one example the UE enters enhanced state when T1 expires regardless of whether any other (if any) is met or not.

2. In another example the UE enters enhanced state provided that at least one of the conditions or criteria in the set of conditions (CgX) is met regardless of whether T1 has expired or not. Where CgX={Cg1, Cg2, Cg3, Cg4}

3. In another example the UE enters enhanced state provided that at least the following two conditions are met:

T1 expires, and

At least one of the conditions in the set of conditions (CgX) is met.

The UE may start evaluating criteria in set CgX starting from a reference time (Tr1). In one example Tr1 is the time when T1 expires. In another example Tr1 is the time when UE enters operation in normal state. In another example Tr1 is pre-defined or configured by the network node T1 can be reset if the UE meets at least one of the conditions or criteria in set of conditions (CgY). Where Cgy={Cg5, Cg6, Cg7, Cg8}.

The UE may also start evaluating criteria in set CgY starting from a reference time (Tr2). In one example Tr2 is the time when T1 starts. In another example Tr2 is the time when UE enters operation in the normal state. In another example Tr2 is pre-defined or configured by the network node.

The set of conditions, CgX, is described below with examples. General or generic examples of criteria are expressed by the following expressions, where each expression corresponds to criteria denoted by 'CgX':

$$Cg1 = f1(N1, H1, \alpha 1)$$

$$Cg2 = f2(N2, H2, \alpha 2)$$

$$Cg3 = f3(P1)$$

$$Cg4 = f4(Cg1, Cg2, Cg3)$$

Cg4 refers to combination of criteria. Cg4 is met when at least 2 or more criteria (Cg1, Cg2 and Cg3) are met.

In one example:

Cg1 can be expressed as follows:

Cg1 criterion is met if $N1 > \alpha 1$; otherwise Cg1 criterion is not met

Cg2 can be expressed as follows:

Cg2 criterion is met if $N2 > \alpha 2$; otherwise Cg2 criterion is not met.

where:

N1 is the number of times L1-RSRP measured by the UE is below certain threshold (H1). Each L1-RSRP is measured over its measurement period. L1-RSRP is measured by UE on reference signal resource (e.g., CSI-RS, SSB etc) of a beam as part of beam management procedure e.g., for candidate beam detection. N1 is estimated or determined or evaluated by the UE during one or more of the following:

over certain time period (Tx1) starting from reference time, Tr1, over the last N11 number of L1-RSRP measurement period starting from reference time, Tr1.

$\alpha 1$ is the threshold to compare N1

N2 is the number of times a pre-defined or by network node configured hypothetical error rate of PDCCH estimated by the UE exceeds a threshold (H2). Each hypothetical error rate of PDCCH is measured over its estimation period. Hypothetical error rate of PDCCH is estimated or derived by the UE based on radio link quality of a reference signal resource (e.g., CSI-RS, SSB etc) of a beam as part of beam management procedure e.g., for beam failure detection. N2 is estimated or determined or evaluated by the UE during one or more of the following:

over a certain time period (Ty1) starting from reference time, Tr1, over the last N21 number of evaluation periods for hypothetical error rate of PDCCH starting from reference time, Tr1.

$\alpha 2$ is the threshold to compare N2.

P1 is the spatial relationship between the UE's position and track layout (e.g., distance between BS etc.). The UE position may be assessed by e.g., GPS, information provided from the train operation system or based on knowledge of the train speed and time since a last known UE position. If one parameter P1 is not sufficient, more parameters can assist to build composite spatial relationship.

The set of conditions, CgY, is described below with examples. General or generic examples of criteria are expressed by the following expressions, where each expression corresponds to criteria denoted by 'CgY'

$$Cg5 = f5(N3, H3, \beta 1)$$

$$Cg6 = f6(N4, H4, \beta 2)$$

$$Cg7 = f7(P2)$$

$$Cg8 = f8(Cg5, Cg6, Cg7)$$

Cg8 refers to combination of criteria. Cg8 is met when at least 2 or more criteria (Cg5, Cg6 and Cg7) are met.

In one example:

Cg5 can be expressed as follows:

Cg5 criterion is met if $N3 > \beta 1$; otherwise Cg5 criterion is not met.

Cg6 can be expressed as follows:

Cg6 criterion is met if $N4 > \beta 2$; otherwise Cg6 criterion is not met.

where:

N3 is the number of times L1-RSRP measured by the UE is equal to or above threshold (H3). In one example H3+H1. In another example H3=H1. N3 is estimated or determined or evaluated by the UE during one or more of the following:

over certain time period (Tx2) starting from reference time, Tr2, over the last N31 number of L1-RSRP measurement period starting from reference time, Tr2.

$\beta 1$ is the threshold to compare N3.

N4 is the number of times a pre-defined or by network node configured hypothetical error rate of PDCCH estimated by the UE is equal to or below a threshold (H4). In one example $H4 \neq H2$. In another example H4=H2. N4 is estimated or determined or evaluated by the UE during one or more of the following:

over certain time period (Ty2) starting from reference time, Tr2, over the last N41 number of evaluation periods for hypothetical error rate of PDCCH starting from reference time, Tr2.

$\beta 2$ is the threshold to compare N4.

P2 is the spatial relationship between UE's position and track layout (e.g., distance between BS etc.). The UE position may be assessed by e.g., GPS, information provided from the train operation system or based on knowledge of the train speed and time since a last known UE position. If one parameter P1 is not sufficient, more parameters can assist to build composite spatial relationship.

UE Switching or Transitioning from Enhanced State to Normal State

In this procedure the UE is currently operating in enhanced state e.g., performing beamsweeping with K2 number of RX beams. When one or more criteria (as described below) is met then the UE switches to normal state e.g., start performing beamsweeping with K1 number of RX beams after the transition. The examples of different criteria for triggering the transition to enhanced state are described below:

In one example, the UE can be configured with a timer, T2, when the UE is in the enhanced state. T2 can also be expressed in time units (e.g., ms, seconds, minutes etc.) or time resources (e.g., slots, frames, SFN cycles, hyper SFN cycles etc.). The UE starts T2 upon a triggering condition. In one example, T2 starts when the UE enters operation in the enhanced state. In another example the UE can be configured to start T2 anytime during the enhanced state. In another example the UE can be configured to start T2 when certain condition is met during the enhanced state e.g., when signal quality and/or signal strength increase above or become equal to their respective thresholds etc. The expiration of timer T2 enables the UE to determine whether to change from the enhanced state to the normal state.

In another alternative or second example, the UE stays in the enhanced state until one or more radio link procedures (RLP) are triggered. After the triggering of the RLP(s), the UE changes its beam management state from the enhanced state to the normal state. The RLP procedures which may cause the transition to enhanced state may be pre-defined or configured by the network node. Examples of RLP are TCI state switching, at least Q1 number of in-sync detection as part of radio link procedures (e.g., in one example Q1=1), cell change etc. Examples of cell change are handover, RRC connection re-establishment, RRC connection release with redirection etc.

In another alternative or third example the UE enters normal state provided that at least one of the conditions or criteria in the set of conditions (CgZ) is met regardless of whether T2 has expired or not. Where CgZ={Cg9, Cg10, Cg11, Cg12}. In one example the UE may also reset T2 when one or more CgZ criteria is met.

In another alternative or fourth example the UE enters normal state provided that at least the following two conditions are met:

T2 expires, and

At least one of the conditions in the set of conditions (CgZ) is met.

The set of conditions, CgZ, is described below with examples. The UE may start evaluating criteria in set CgZ starting from a reference time (Tr3). In one example Tr13 is the time when T2 expires. In another example Tr3 is the time when UE enters in enhanced state. In another example Tr3 is pre-defined or configured by the network node.

General or generic examples of criteria are expressed by the following expressions, where each expression corresponds to criteria denoted by 'CgZ':

$$Cg9 = f9(N5, H5, \Psi1)$$

$$Cg10 = f10(N6, H6, \Psi2)$$

$$Cg11 = f11(P3)$$

$$Cg12 = f12(Cg9, Cg10, Cg11)$$

Cg12 refers to combination of criteria. Cg12 is met when at least 2 or more criteria (Cg9, Cg10 and Cg11) are met.

In one example:

Cg9 can be expressed as follows:

Cg9 criterion is met if $N5 > \Psi1$; otherwise Cg9 criterion is not met.

Cg10 can be expressed as follows:

Cg10 criterion is met if $N6 > \Psi2$; otherwise Cg10 criterion is not met.

where:

N5 is the number of times L1-RSRP measured by the UE is equal to or above threshold (H5). In one example H5≠H3. In another example H5=H3. N5 is estimated or determined or evaluated by the UE during one or more of the following:

over certain time period (Tx3) starting from reference time, Tr3, over the last N51 number of L1-RSRP measurement period starting from reference time, Tr3.

$\Psi2$ is the threshold to compare N6.

P3 is the spatial relationship between the UE's position and the train track layout (e.g., distance between BS etc.). The UE position may be assessed by e.g., GPS, information provided from the train operation system or based on knowledge of the train speed and time since a last known UE position. If one parameter P1 is not sufficient, more parameters can assist to build composite spatial relationship.

Figures 4, 5:
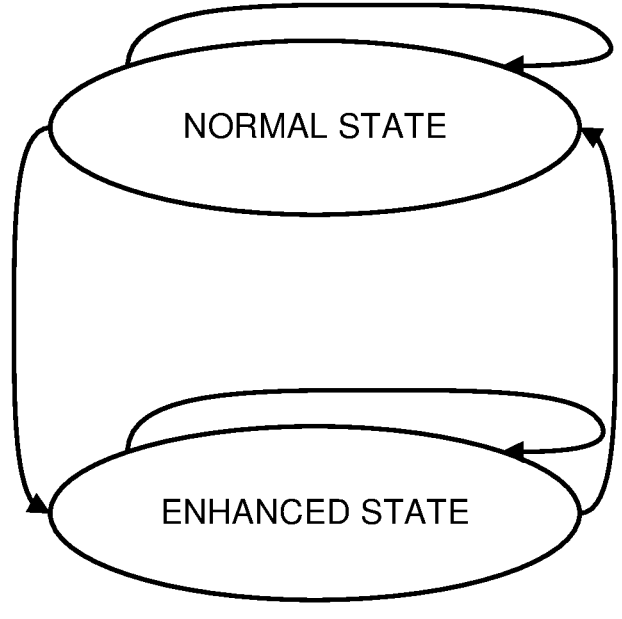
FIG. 4 is an illustration of a transition between normal (first) state and enhanced (second) states for beam management/link recovery according to some embodiments of inventive concepts.
FIG. 5 is an illustration of a normal state and an enhanced state according to some embodiments of inventive concepts.

The UE needs to have at least two states are necessary including mechanism of switching as shown in FIG. 4.

Embodiment 2: UE Beam Enhancement Behavior Upon Transition

After entering the enhanced state, the UE implements beam management enhancement to gain extra or wider angular or spherical coverage with additional or updated beam sweeping, as demonstrated in FIG. 5.

Additional or updated beam sweep can increase the number of UE RX beams (e.g., to allow more beamsweeps to cover more directions) and/or widening beam width and/or changes in beam pattern (e.g., from fine beam to rough beam etc.).

The directions and/or number of additional beam sweep can be pre-defined or configured by the network node. Similarly, wide beamwidth can be pre-defined or configurated by the network node.

A general rationale behind additional or updated beam sweep is to enable the UE to cover more or extra spatial coverage. This enables the UE to receive signals/beams from the strongest RRH or RRM whose signal level is above a certain threshold.

Figure 6:
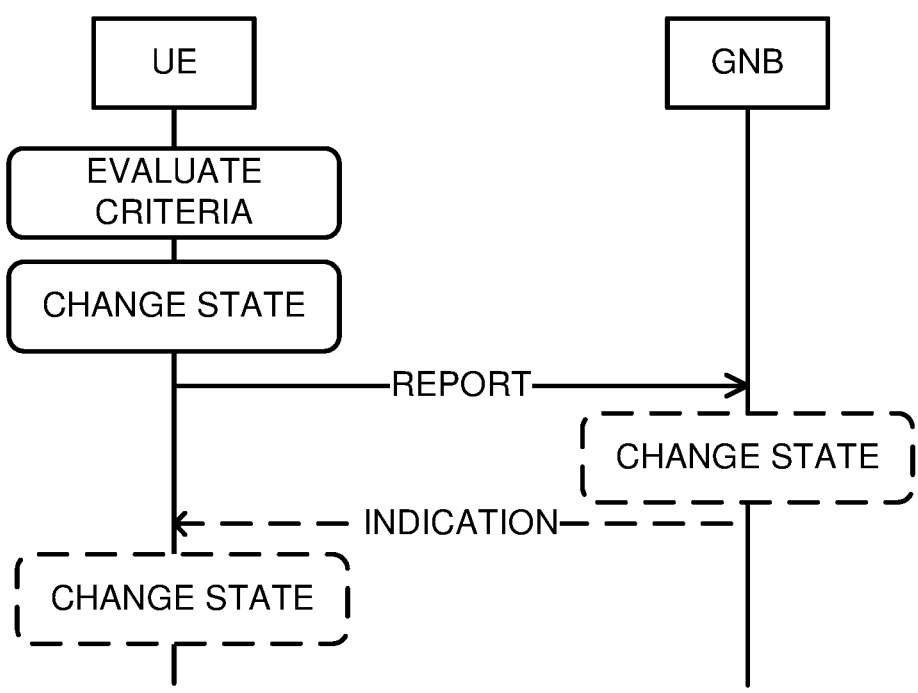
FIG. 6 is a signaling diagram illustrating signalling between a UE and a base station if a remote radio head is included according to some embodiments of inventive concepts.

In another example the UE may send indication or message to the network node indicating whether the UE's beam management state has changed or not e.g., from normal state to enhanced state or from enhanced state to normal state. The UE may send the message via RRC message, DCI or MAC CE. This is shown in FIG. 6. Based on the received UE's report/message/results the network node can perform one or more operations or tasks as explained below:

In one example, based on the received message, the network node can determine if the TX beam needs to be changed subsequently in the network node.

In another example, based on the received message, the network node can determine if it has to trigger one or more operations, procedures or tasks e.g., TCI state switching, cell change etc.

A further alternative may be that the network has knowledge of the train track layout and the fact that for some proportion of the train track, the BS beam coverage will be more spatially diverse and the UE will need to enter the enhanced mode. In this case, the BS (or network) may signal to the UE that it should enter (or leave) the enhanced mode (independently of the criteria for the UE to determine whether it should enter enhanced mode).

In a further alternative, the network node may use other criteria that may include some or all of the criteria the UE uses to decide to have the UE change states. When one or more of the other criteria is met, the network node or network transmits a command towards the UE to change state.

Figure 7:
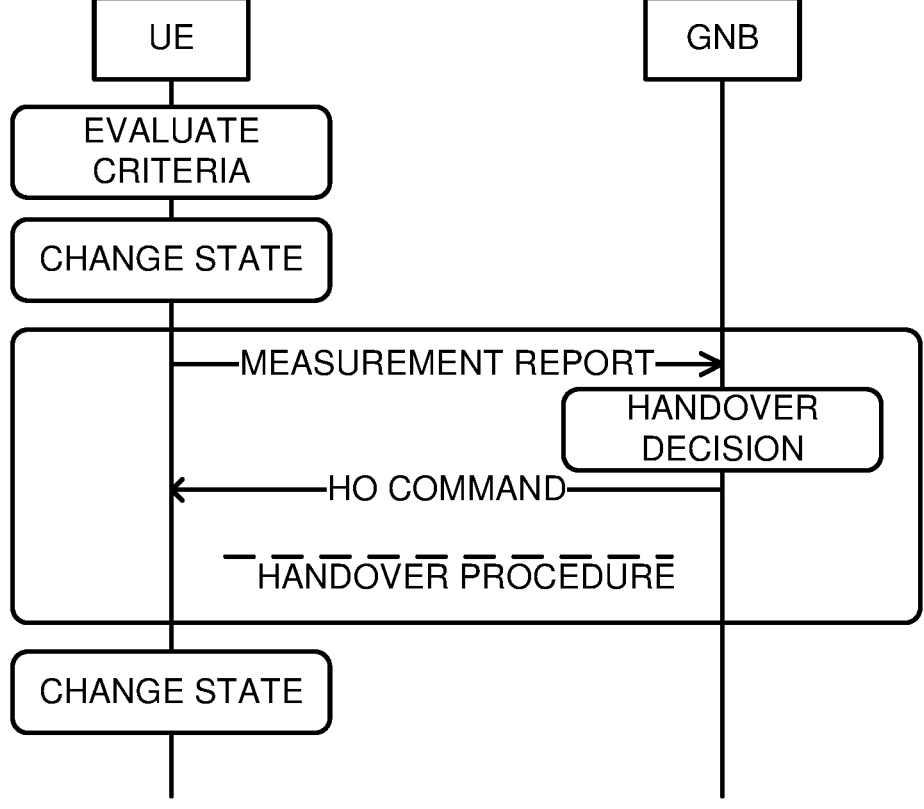
FIG. 7 is a signaling diagram illustrating signalling between a UE and a base station during a handover or in an enhanced state according to some embodiments of inventive concepts.

In another alternative or example, the cell change (e.g., handover, RRC connection release with redirection etc) can be integrated or associated with enhanced state. An example is provided in FIG. 7. The UE enters enhanced state due to risking link/beam quality degradation before finding a next cell, and subsequently, UE reverts back to normal state after handover. This is further elaborated with examples below:

In one example, when the UE enters operation in the enhanced state, the UE sends an indication to the network node that it has changed to the enhanced state. In response, the network node sends cell change command (e.g., handover to target cell). The UE performs the cell change while staying in enhanced state until the handover is successfully completed e.g., after the UE send uplink signal (e.g., RACH (random access channel) in the target cell/RRH. After the cell change, the UE may revert back to normal state or receive an indication from the network node to change from the enhanced state to the normal state.

In another example, during the cell change operation, the UE enters operation in enhanced state (if the UE was in the normal state) and stays in the enhanced state until the handover is successfully completed e.g., after the UE has sent uplink signal (e.g., RACH) in the target cell/RRH. After the cell change, the UE may revert back to the normal state or receive an indication from the network node to change from the enhanced state to the normal state.

In the description that follows, while the communication device may be any of the communication device 800, wireless device 1512A, 1512B, wired or wireless devices UE 1512C, UE 1512D, UE 1600, virtualization hardware 1904, virtual machines 1908A, 1908B, or UE 2006, the communication device 800 shall be used to describe the functionality of the operations of the communication device. Operations of the communication device 800 (implemented using the structure of the block diagram of FIG. 8) will now be discussed with reference to the flow chart of FIG. 11 according to some embodiments of inventive concepts. For example, modules may be stored in memory 805 of FIG. 8, and these modules may provide instructions so that when the instructions of a module are executed by respective communication device processing circuitry 803, processing circuitry 803 performs respective operations of the flow chart.

Turning to FIG. 11, in block 1101, the processing circuitry 803 determines whether to change from the first state to the second state based on one or more first criteria while operating in the first state or determines whether to change from the second state to the first state based on one or more second criteria while operating in the second state. Various embodiments of the first criteria and the second criteria are described above in the description of UE switching between normal and enhanced states based on one or more criteria and the description of UE switching or transitioning between enhanced and normal states based on one or more criteria.

In block 1103, the processing circuitry 803 determines whether to change from the first state to the second state (while operating in the first state). In some embodiments of inventive concepts, the processing circuitry 803 determines whether to change from the first state to the second state based on one or more first criteria by determining whether to change from the first state to the second state based on pre-defined criteria. In other embodiments of inventive concepts, the processing circuitry 803 determines whether to change from the first state to the second state based on one or more first criteria by determining whether to change from the first state to the second state based on a timer expiring.

In yet other embodiments of inventive concepts, the processing circuitry 803 determines whether to change from the first state to the second state based on one or more first criteria by determining whether to change from the first state to the second state based on a position of the UE. In some of these embodiments, the processing circuitry 803 determines whether to change from the first state to the second state based on a position of the UE by determining whether to change from the first state to the second state based on a position of the UE between a first remote radio head, RRH, and a second RRH along a high speed train track.

In further embodiments of inventive concepts, the processing circuitry 803 determines whether to change from the first state to the second state based on one or more first criteria by determining whether to change from the first state to the second state based on a time over which a measured reference signal received power, RSRP, is below a RSRP threshold. In still other embodiments of inventive concepts, the processing circuitry 803 determines whether to change from the first state to the second state based on one or more first criteria by determining whether to change from the first state to the second state based on signal quality.

Responsive to determining to change from the first state to the second state, the processing circuitry 803 changes the UE to operating in the second state in block 1105 and performs at least one action in the second state in block 1107.

In some embodiments of inventive concepts, the processing circuitry 803 performs the at least one action in the second state by implementing beam management enhancement to gain extra or wider angular or spherical coverage with increased or updated beam sweeping.

In some of these embodiments, the processing circuitry 803 implements the beam management enhancement by implementing the beam management enhancement responsive to at least one criteria being fulfilled. In other of these embodiments, the processing circuitry 803 implements the beam management enhancement by implementing beam management enhancement on at least one of synchronization signal and PBCH, physical broadcast channel, block, SSB, channel state information reference signals, CSI-RS, and a reference signal that is used for radio link monitoring, RLM, or beam failure detection, BFD.

In block 1109, the processing circuitry 803 determines whether to change from the second state to the first state (while operating in the second state). In some embodiments of inventive concepts, the processing circuitry 803 determines whether to change from the second state to the first state based on a second timer expiring. In other embodiments of inventive concepts, the processing circuitry 803 determines whether to change from the second state to the first state based on the second timer expiring and at least one condition or criteria being met. In further embodiments of inventive concepts, the processing circuitry 803 determines whether to change from the second state to the first state based on at least one condition or criteria being met.

In some embodiments of determining whether to change from the second state to the first state based on at least one condition or criteria, the processing circuitry 803 determines to change from the second state to the first state based on one or more radio link procedures, RLP, being triggered. In some of these embodiments, the one or more RLPs are one or more pre-defined RLPs. In other of these embodiments, the one or more RLPs are configured by a network node.

In other embodiments of determining whether to change from the second state to the first state based on at least one condition or criteria, the processing circuitry 803 determines to change from the second state to the first state based on a position of the UE. In some of these other embodiments, the processing circuitry 803 determines to change from the second state to the first state based on a position of the UE by determining whether to change from the second state to the first state based on a position of the UE between a first remote radio head, RRH, and a second RRH along a high speed train track.

In further embodiments of inventive concepts, the processing circuitry 803 determines whether to change from the second state to the first state based on one or more second criteria by determining whether to change from the second state to the first state based on a time over which a measured reference signal received power, RSRP, is equal to or above a RSRP threshold.

In yet other embodiments of inventive concepts, the processing circuitry 803 determines whether to change from the second state to the first state based on one or more second criteria by determining whether to change from the second state to the first state based on signal quality.

Returning to FIG. 11, in block 1111, responsive to determining to change from the second state to the first state, the processing circuitry 803 changes the UE to operating in the first state.

In block 1113, the processing circuitry 803 may, in some embodiments but not in other embodiments, send an indication to a network node indicating whether the UE has changed from the first state to the second state or changed from the second state to the first state.

FIG. 12 illustrates some embodiments of inventive concepts where the UE temporarily changes from the first state to the second state. Turning to FIG. 12, in block 1201, the processing circuitry 803, while operating in the first state, applies enhanced beam management during a cell change procedure. Various embodiments of enhanced beam management have been described above.

In block 1203, the processing circuitry 803 reverts back to operating in the first state after the cell change has been completed. In some of these embodiments, the processing circuitry 803 reverts bask to operating in the first state responsive to a network node sends an indication to the processing circuitry 803 to change back to operating in the first state.

In various other embodiments of inventive concepts, the processing circuitry 803 operates the UE in the first state to perform beam sweeping with a first number of receive, RX, beams. The processing circuitry 803 operates the UE in the second state to perform beam sweeping with a second number of receive, RX, beams. In some embodiments, the second number is greater than the first number.

In various other embodiments of inventive concepts, the network node commands the UE to change states as illustrated in FIG. 13. Turning to FIG. 13, in block 1301, the processing circuitry 803, responsive to receiving a command to change to the second state while operating in the first state, changes from the first state to the second state. In block 1303, the processing circuitry 803, responsive to receiving a command to change to the first state while operating in the second state, changes from the second state to the first state.

In the description that follows, while the network node may be any of the RAN node 1000, network node 1510A, 1510B, 1700, 2006, hardware 1904, or virtual machine 1908A, 1908B, the RAN node 1000 shall be used to describe the functionality of the operations of the network node. Operations of the RAN node 1000 (implemented using the structure of FIG. 10) will now be discussed with reference to the flow chart of FIG. 14 according to some embodiments of inventive concepts. For example, modules may be stored in memory 1005 of FIG. 10, and these modules may provide instructions so that when the instructions of a module are executed by respective RAN node processing circuitry 1003, processing circuitry 1003 performs respective operations of the flow chart.

Turning to FIG. 14, in block 1401, the processing circuitry 903 receives information from a user equipment, UE, indicating that the UE has switched from a first state for beam management to a second state for beam management or from the second state to the first state. In block 1403, the processing circuitry 903, responsive to receiving the information, performs one or more tasks based on whether the UE has switched from the first state to the second state or from the second state to the first state.

In some embodiments of inventive concepts, the processing circuitry 903 performs the one or more tasks by changing a transmit, TC, beam responsive to determining that a transmit, TC, beam needs to be changed.

In other embodiments of inventive concepts, the processing circuitry 903 performs the one or more tasks by triggering one or more procedures or tasks for the UE to perform. Some of the one or more procedures may include one or more of transmission configuration indication, TCI, state switching, a cell change to a target cell, and a cell change to a target cell only when the UE has switched from the first state to the second state.

In further embodiments, the network node has knowledge of a train track layout and that for some proportion of the track, a remote radio head, RRH beam coverage will be more spatially diverse and the UE will need to enter the enhanced mode. In these further embodiments, the processing circuitry 803 performs the one or more tasks by signalling to the UE that the UE must enter or must leave a beam management enhancement operation.

Figure 15:
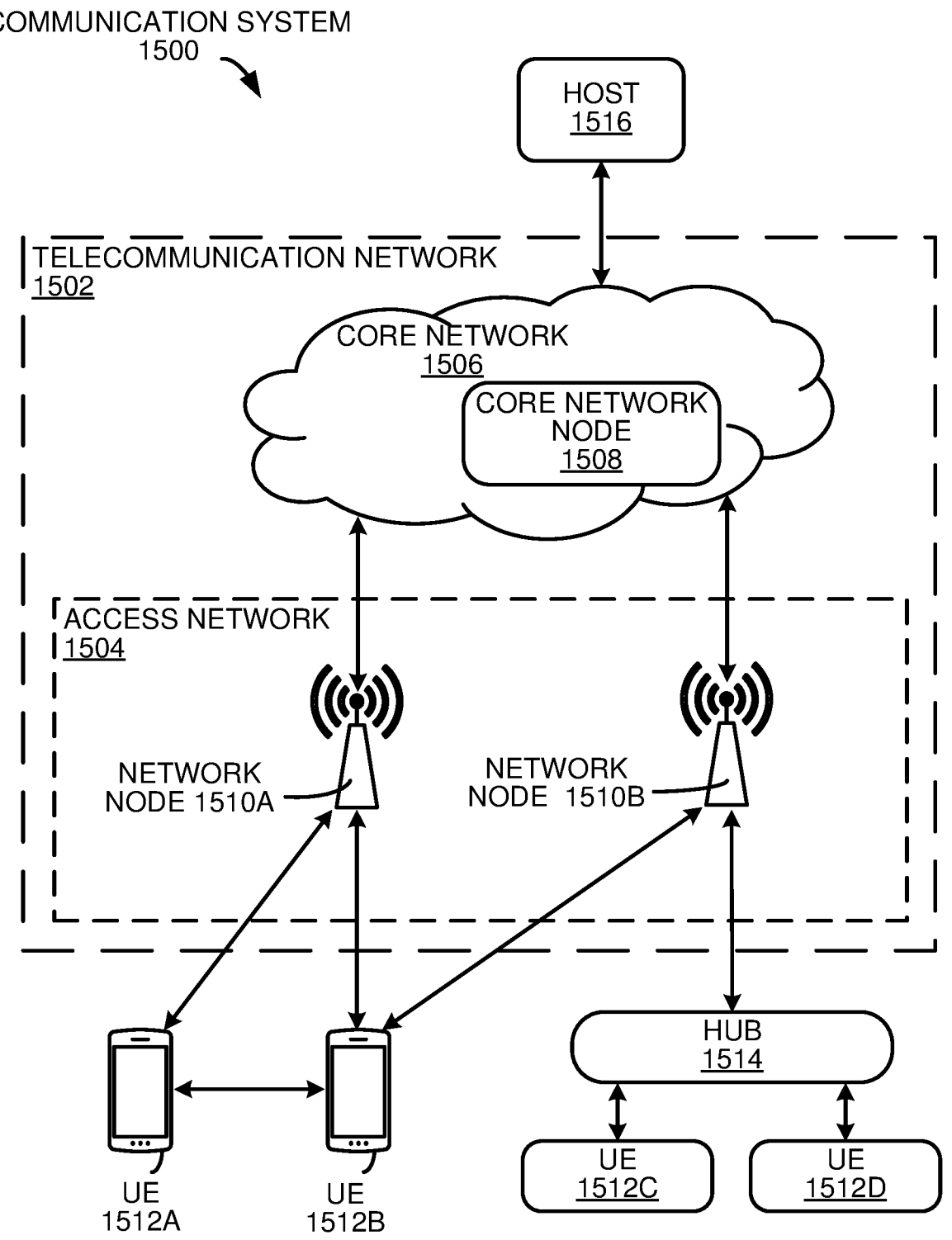
FIG. 15 is a block diagram of a communication system in accordance with some embodiments.

FIG. 15 shows an example of a communication system 1500 in accordance with some embodiments.

In the example, the communication system 1500 includes a telecommunication network 1502 that includes an access network 1504, such as a radio access network (RAN), and a core network 1506, which includes one or more core network nodes 1508. The access network 1504 includes one or more access network nodes, such as network nodes 1510a and 1510b (one or more of which may be generally referred to as network nodes 1510), or any other similar $3^{rd}$ Generation Partnership Project (3GPP) access node or non-3GPP access point. The network nodes 1510 facilitate direct or indirect connection of user equipment (UE), such as by connecting UEs 1512a, 1512b, 1512c, and 1512d (one or more of which may be generally referred to as UEs 1512) to the core network 1506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1500 may include any number of wired or wireless networks, network nodes, UEs, and/or any other components or systems that may facilitate or participate in the communication of data and/or signals whether via wired or wireless connections. The communication system 1500 may include and/or interface with any type of communication, telecommunication, data, cellular, radio network, and/or other similar type of system.

The UEs 1512 may be any of a wide variety of communication devices, including wireless devices arranged, configured, and/or operable to communicate wirelessly with the network nodes 1510 and other communication devices. Similarly, the network nodes 1510 are arranged, capable, configured, and/or operable to communicate directly or indirectly with the UEs 1512 and/or with other network nodes or equipment in the telecommunication network 1502 to enable and/or provide network access, such as wireless network access, and/or to perform other functions, such as administration in the telecommunication network 1502.

In the depicted example, the core network 1506 connects the network nodes 1510 to one or more hosts, such as host 1516. These connections may be direct or indirect via one or more intermediary networks or devices. In other examples, network nodes may be directly coupled to hosts. The core network 1506 includes one more core network nodes (e.g., core network node 1508) that are structured with hardware and software components. Features of these components may be substantially similar to those described with respect to the UEs, network nodes, and/or hosts, such that the descriptions thereof are generally applicable to the corresponding components of the core network node 1508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1516 may be under the ownership or control of a service provider other than an operator or provider of the access network 1504 and/or the telecommunication network 1502, and may be operated by the service provider or on behalf of the service provider. The host 1516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1500 of FIG. 15 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1502 is a cellular network that implements 3GPP standardized features. Accordingly, the telecommunications network 1502 may support network slicing to provide different logical networks to different devices that are connected to the telecommunication network 1502. For example, the telecommunications network 1502 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1512 are configured to transmit and/or receive information without direct human interaction. For instance, a UE may be designed to transmit information to the access network 1504 on a predetermined schedule, when triggered by an internal or external event, or in response to requests from the access network 1504. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1514 communicates with the access network 1504 to facilitate indirect communication between one or more UEs (e.g., UE 1512*c* and/or 1512*d*) and network nodes (e.g., network node 1510*b*). In some examples, the hub 1514 may be a controller, router, content source and analytics, or any of the other communication devices described herein regarding UEs. For example, the hub 1514 may be a broadband router enabling access to the core network 1506 for the UEs. As another example, the hub 1514 may be a controller that sends commands or instructions to one or more actuators in the UEs. Commands or instructions may be received from the UEs, network nodes 1510, or by executable code, script, process, or other instructions in the hub 1514. As another example, the hub 1514 may be a data collector that acts as temporary storage for UE data and, in some embodiments, may perform analysis or other processing of the data. As another example, the hub 1514 may be a content source. For example, for a UE that is a VR headset, display, loudspeaker or other media delivery device, the hub 1514 may retrieve VR assets, video, audio, or other media or data related to sensory information via a network node, which the hub 1514 then provides to the UE either directly, after performing local processing, and/or after adding additional local content. In still another example, the hub 1514 acts as a proxy server or orchestrator for the UEs, in particular in if one or more of the UEs are low energy IoT devices.

The hub 1514 may have a constant/persistent or intermittent connection to the network node 1510*b*. The hub 1514 may also allow for a different communication scheme and/or schedule between the hub 1514 and UEs (e.g., UE 1512*c* and/or 1512*d*), and between the hub 1514 and the core network 1506. In other examples, the hub 1514 is connected to the core network 1506 and/or one or more UEs via a wired connection. Moreover, the hub 1514 may be configured to connect to an M2M service provider over the access network 1504 and/or to another UE over a direct connection. In some scenarios, UEs may establish a wireless connection with the network nodes 1510 while still connected via the hub 1514 via a wired or wireless connection. In some embodiments, the hub 1514 may be a dedicated hub—that is, a hub whose primary function is to route communications to/from the UEs from/to the network node 1510*b*. In other embodiments, the hub 1514 may be a non-dedicated hub—that is, a device which is capable of operating to route communications between the UEs and network node 1510*b*, but which is additionally capable of operating as a communication start and/or end point for certain data channels.

Figure 16:
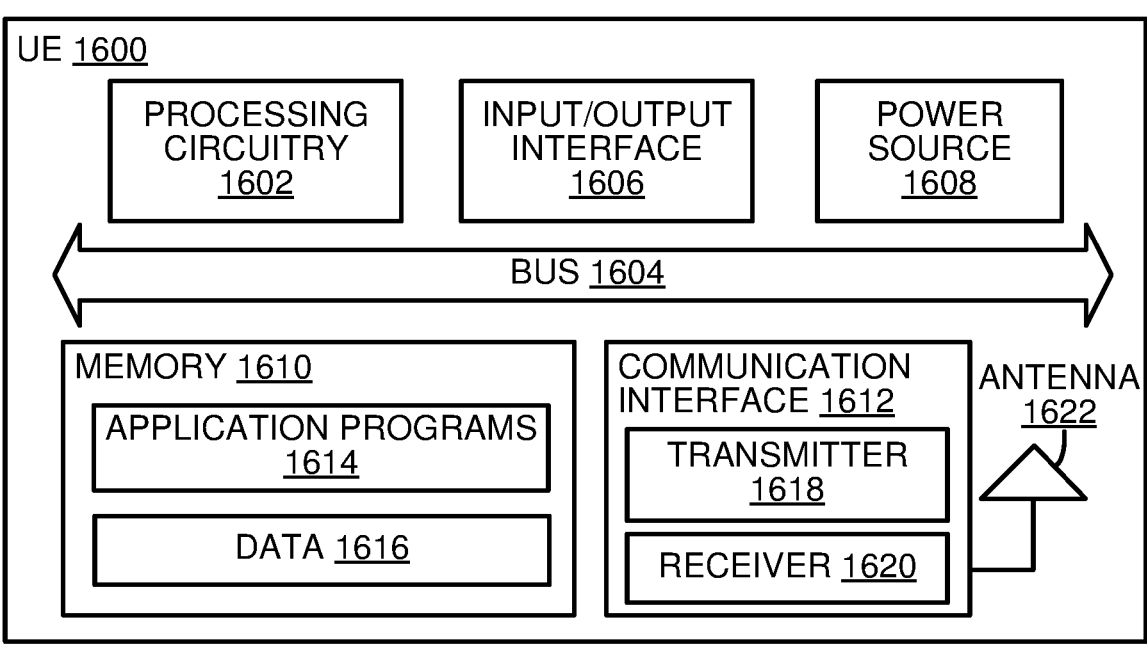
FIG. 16 is a block diagram of a user equipment in accordance with some embodiments.

FIG. 16 shows a UE 1600 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1600 includes processing circuitry 1602 that is operatively coupled via a bus 1604 to an input/output interface 1606, a power source 1608, a memory 1610, a communication interface 1612, and/or any other component, or any combination thereof. Certain UEs may utilize all or a subset of the components shown in FIG. 16. The level of integration between the components may vary from one UE to another UE. Further, certain UEs may contain multiple instances of a component, such as multiple processors, memories, transceivers, transmitters, receivers, etc.

The processing circuitry 1602 is configured to process instructions and data and may be configured to implement any sequential state machine operative to execute instructions stored as machine-readable computer programs in the memory 1610. The processing circuitry 1602 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1602 may include multiple central processing units (CPUs).

In the example, the input/output interface 1606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1608 is structured as a battery or battery pack. Other types of power sources, such as an external power source (e.g., an electricity outlet), photovoltaic device, or power cell, may be used. The power source 1608 may further include power circuitry for delivering power from the power source 1608 itself, and/or an external power source, to the various parts of the UE 1600 via input circuitry or an interface such as an electrical power cable. Delivering power may be, for example, for charging of the power source 1608. Power circuitry may perform any formatting, converting, or other modification to the power from the power source 1608 to make the power suitable for the respective components of the UE 1600 to which power is supplied.

The memory 1610 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1610 includes one or more application programs 1614, such as an operating system, web browser application, a widget, gadget engine, or other application, and corresponding data 1616. The memory 1610 may store, for use by the UE 1600, any of a variety of various operating systems or combinations of operating systems.

The memory 1610 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1610 may allow the UE 1600 to access instructions, application programs and the like, stored on transitory or non-transitory memory media, to off-load data, or to upload data. An article of manufacture, such as one utilizing a communication system may be tangibly embodied as or in the memory 1610, which may be or comprise a device-readable storage medium.

The processing circuitry 1602 may be configured to communicate with an access network or other network using the communication interface 1612. The communication interface 1612 may comprise one or more communication subsystems and may include or be communicatively coupled to an antenna 1622. The communication interface 1612 may include one or more transceivers used to communicate, such as by communicating with one or more remote transceivers of another device capable of wireless communication (e.g., another UE or a network node in an access network). Each transceiver may include a transmitter 1618 and/or a receiver 1620 appropriate to provide network communications (e.g., optical, electrical, frequency allocations, and so forth). Moreover, the transmitter 1618 and receiver 1620 may be coupled to one or more antennas (e.g., antenna 1622) and may share circuit components, software or firmware, or alternatively be implemented separately.

In the illustrated embodiment, communication functions of the communication interface 1612 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1600 shown in FIG. 16.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 17:
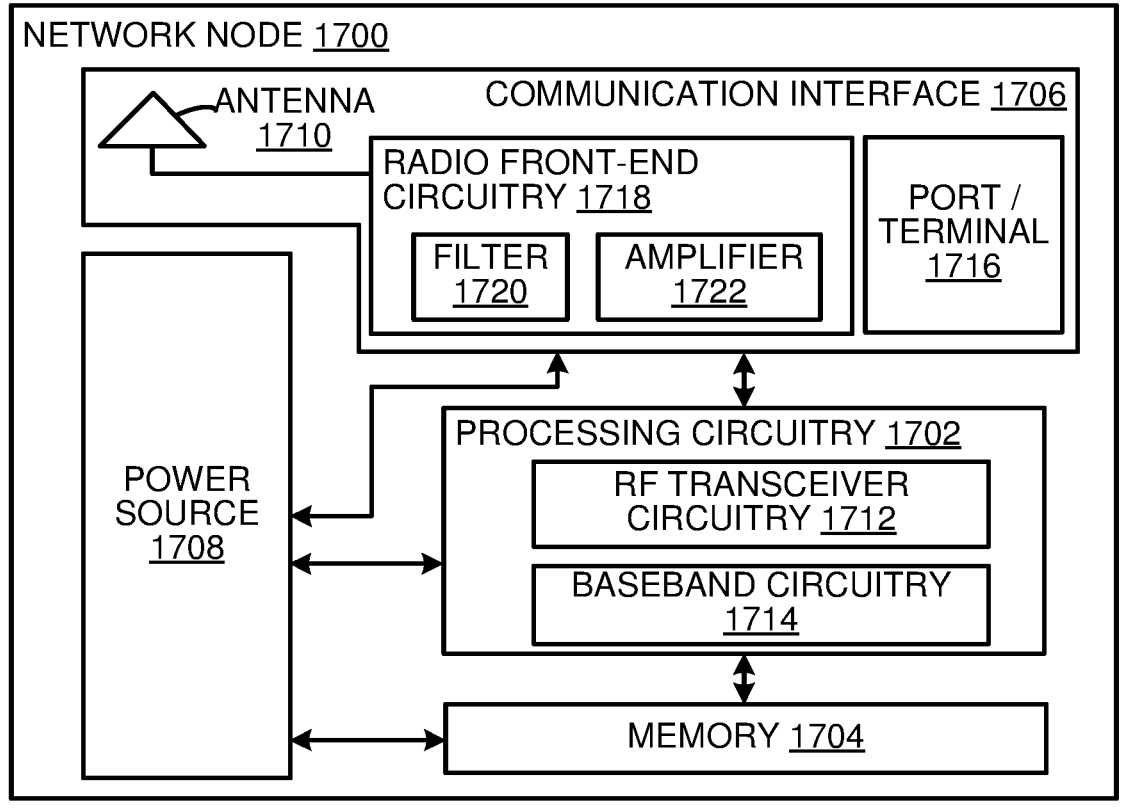
FIG. 17 is a block diagram of a network node in accordance with some embodiments.

FIG. 17 shows a network node 1700 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1700 includes a processing circuitry 1702, a memory 1704, a communication interface 1706, and a power source 1708. The network node 1700 may be composed of multiple physically separate components (e.g., a NodeB component and a RNC component, or a BTS component and a BSC component, etc.), which may each have their own respective components. In certain scenarios in which the network node 1700 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1700 may be configured to support multiple radio access technologies (RATs). In such embodiments, some components may be duplicated (e.g., separate memory 1704 for different RATs) and some components may be reused (e.g., a same antenna 1710 may be shared by different RATs). The network node 1700 may also include multiple sets of the various illustrated components for different wireless technologies integrated into network node 1700, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1700.

The processing circuitry 1702 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1700 components, such as the memory 1704, to provide network node 1700 functionality.

In some embodiments, the processing circuitry 1702 includes a system on a chip (SOC). In some embodiments, the processing circuitry 1702 includes one or more of radio frequency (RF) transceiver circuitry 1712 and baseband processing circuitry 1714. In some embodiments, the radio frequency (RF) transceiver circuitry 1712 and the baseband processing circuitry 1714 may be on separate chips (or sets of chips), boards, or units, such as radio units and digital units. In alternative embodiments, part or all of RF transceiver circuitry 1712 and baseband processing circuitry 1714 may be on the same chip or set of chips, boards, or units.

The memory 1704 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1702. The memory 1704 may store any suitable instructions, data, or information, including a computer program, software, an application including one or more of logic, rules, code, tables, and/or other instructions capable of being executed by the processing circuitry 1702 and utilized by the network node 1700. The memory 1704 may be used to store any calculations made by the processing circuitry 1702 and/or any data received via the communication interface 1706. In some embodiments, the processing circuitry 1702 and memory 1704 is integrated.

The communication interface 1706 is used in wired or wireless communication of signaling and/or data between a network node, access network, and/or UE. As illustrated, the communication interface 1706 comprises port(s)/terminal(s) 1716 to send and receive data, for example to and from a network over a wired connection. The communication interface 1706 also includes radio front-end circuitry 1718 that may be coupled to, or in certain embodiments a part of, the antenna 1710. Radio front-end circuitry 1718 comprises filters 1720 and amplifiers 1722. The radio front-end circuitry 1718 may be connected to an antenna 1710 and processing circuitry 1702. The radio front-end circuitry may be configured to condition signals communicated between antenna 1710 and processing circuitry 1702. The radio front-end circuitry 1718 may receive digital data that is to be sent out to other network nodes or UEs via a wireless connection. The radio front-end circuitry 1718 may convert the digital data into a radio signal having the appropriate channel and bandwidth parameters using a combination of filters 1720 and/or amplifiers 1722. The radio signal may then be transmitted via the antenna 1710. Similarly, when receiving data, the antenna 1710 may collect radio signals which are then converted into digital data by the radio front-end circuitry 1718. The digital data may be passed to the processing circuitry 1702. In other embodiments, the communication interface may comprise different components and/or different combinations of components.

In certain alternative embodiments, the network node 1700 does not include separate radio front-end circuitry 1718, instead, the processing circuitry 1702 includes radio front-end circuitry and is connected to the antenna 1710. Similarly, in some embodiments, all or some of the RF transceiver circuitry 1712 is part of the communication interface 1706. In still other embodiments, the communication interface 1706 includes one or more ports or terminals 1716, the radio front-end circuitry 1718, and the RF transceiver circuitry 1712, as part of a radio unit (not shown), and the communication interface 1706 communicates with the baseband processing circuitry 1714, which is part of a digital unit (not shown).

The antenna 1710 may include one or more antennas, or antenna arrays, configured to send and/or receive wireless signals. The antenna 1710 may be coupled to the radio front-end circuitry 1718 and may be any type of antenna capable of transmitting and receiving data and/or signals wirelessly. In certain embodiments, the antenna 1710 is separate from the network node 1700 and connectable to the network node 1700 through an interface or port.

The antenna 1710, communication interface 1706, and/or the processing circuitry 1702 may be configured to perform any receiving operations and/or certain obtaining operations described herein as being performed by the network node. Any information, data and/or signals may be received from a UE, another network node and/or any other network equipment. Similarly, the antenna 1710, the communication interface 1706, and/or the processing circuitry 1702 may be configured to perform any transmitting operations described herein as being performed by the network node. Any information, data and/or signals may be transmitted to a UE, another network node and/or any other network equipment.

The power source 1708 provides power to the various components of network node 1700 in a form suitable for the respective components (e.g., at a voltage and current level needed for each respective component). The power source 1708 may further comprise, or be coupled to, power management circuitry to supply the components of the network node 1700 with power for performing the functionality described herein. For example, the network node 1700 may be connectable to an external power source (e.g., the power grid, an electricity outlet) via an input circuitry or interface such as an electrical cable, whereby the external power source supplies power to power circuitry of the power source 1708. As a further example, the power source 1708 may comprise a source of power in the form of a battery or battery pack which is connected to, or integrated in, power circuitry. The battery may provide backup power should the external power source fail.

Embodiments of the network node 1700 may include additional components beyond those shown in FIG. 17 for providing certain aspects of the network node's functionality, including any of the functionality described herein and/or any functionality necessary to support the subject matter described herein. For example, the network node 1700 may include user interface equipment to allow input of information into the network node 1700 and to allow output of information from the network node 1700. This may allow a user to perform diagnostic, maintenance, repair, and other administrative functions for the network node 1700.

Figure 18:
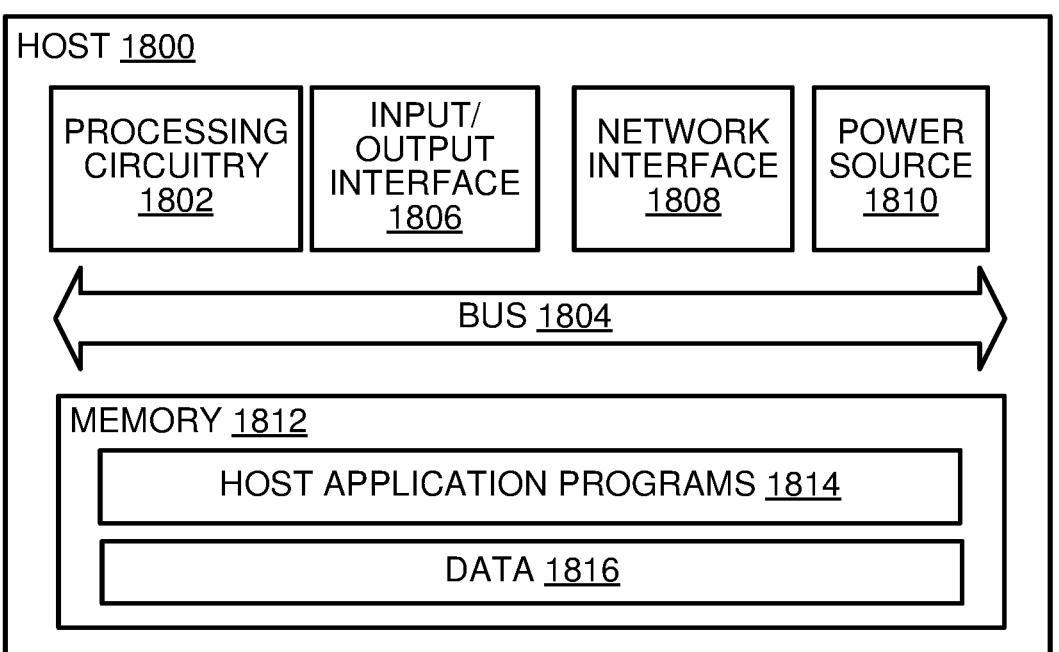
FIG. 18 is a block diagram of a host computer communicating with a user equipment in accordance with some embodiments.

FIG. 18 is a block diagram of a host 1800, which may be an embodiment of the host 1516 of FIG. 15, in accordance with various aspects described herein. As used herein, the host 1800 may be or comprise various combinations hardware and/or software, including a standalone server, a blade server, a cloud-implemented server, a distributed server, a virtual machine, container, or processing resources in a server farm. The host 1800 may provide one or more services to one or more UEs.

The host 1800 includes processing circuitry 1802 that is operatively coupled via a bus 1804 to an input/output interface 1806, a network interface 1808, a power source 1810, and a memory 1812. Other components may be included in other embodiments. Features of these components may be substantially similar to those described with respect to the devices of previous figures, such as FIGS. 16 and 17, such that the descriptions thereof are generally applicable to the corresponding components of host 1800.

The memory 1812 may include one or more computer programs including one or more host application programs 1814 and data 1816, which may include user data, e.g., data generated by a UE for the host 1800 or data generated by the host 1800 for a UE. Embodiments of the host 1800 may utilize only a subset or all of the components shown. The host application programs 1814 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1814 may also provide for user authentication and licensing checks and may periodically report health, routes, and content availability to a central node, such as a device in or on the edge of a core network. Accordingly, the host 1800 may select and/or indicate a different host for over-the-top services for a UE. The host application programs 1814 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 19:
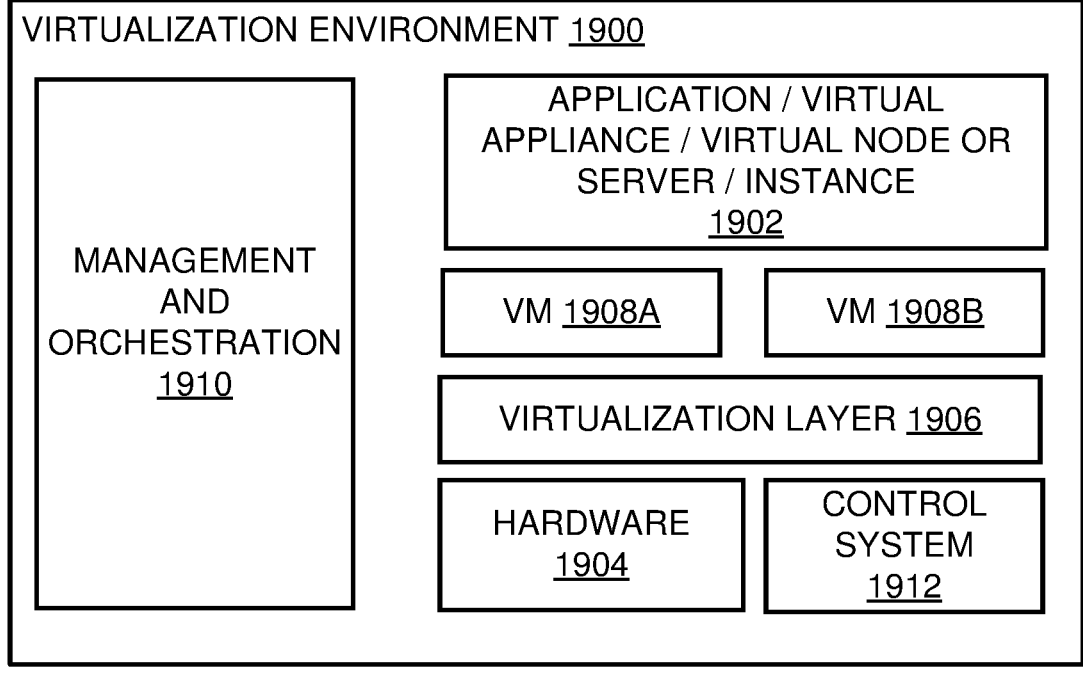
FIG. 19 is a block diagram of a virtualization environment in accordance with some embodiments.

FIG. 19 is a block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1902 (which may alternatively be called software instances, virtual appliances, network functions, virtual nodes, virtual network functions, etc.) are run in the virtualization environment 1900 to implement some of the features, functions, and/or benefits of some of the embodiments disclosed herein.

Hardware 1904 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1906 (also referred to as hypervisors or virtual machine monitors (VMMs)), provide VMs 1908a and 1908b (one or more of which may be generally referred to as VMs 1908), and/or perform any of the functions, features and/or benefits described in relation with some embodiments described herein. The virtualization layer 1906 may present a virtual operating platform that appears like networking hardware to the VMs 1908.

The VMs 1908 comprise virtual processing, virtual memory, virtual networking or interface and virtual storage, and may be run by a corresponding virtualization layer 1906. Different embodiments of the instance of a virtual appliance 1902 may be implemented on one or more of VMs 1908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1908 may be a software implementation of a physical machine that runs programs as if they were executing on a physical, non-virtualized machine. Each of the VMs 1908, and that part of hardware 1904 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1908 on top of the hardware 1904 and corresponds to the application 1902.

Hardware 1904 may be implemented in a standalone network node with generic or specific components. Hardware 1904 may implement some functions via virtualization. Alternatively, hardware 1904 may be part of a larger cluster of hardware (e.g., such as in a data center or CPE) where many hardware nodes work together and are managed via management and orchestration 1910, which, among others, oversees lifecycle management of applications 1902. In some embodiments, hardware 1904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1912 which may alternatively be used for communication between hardware nodes and radio units.

Figure 20:
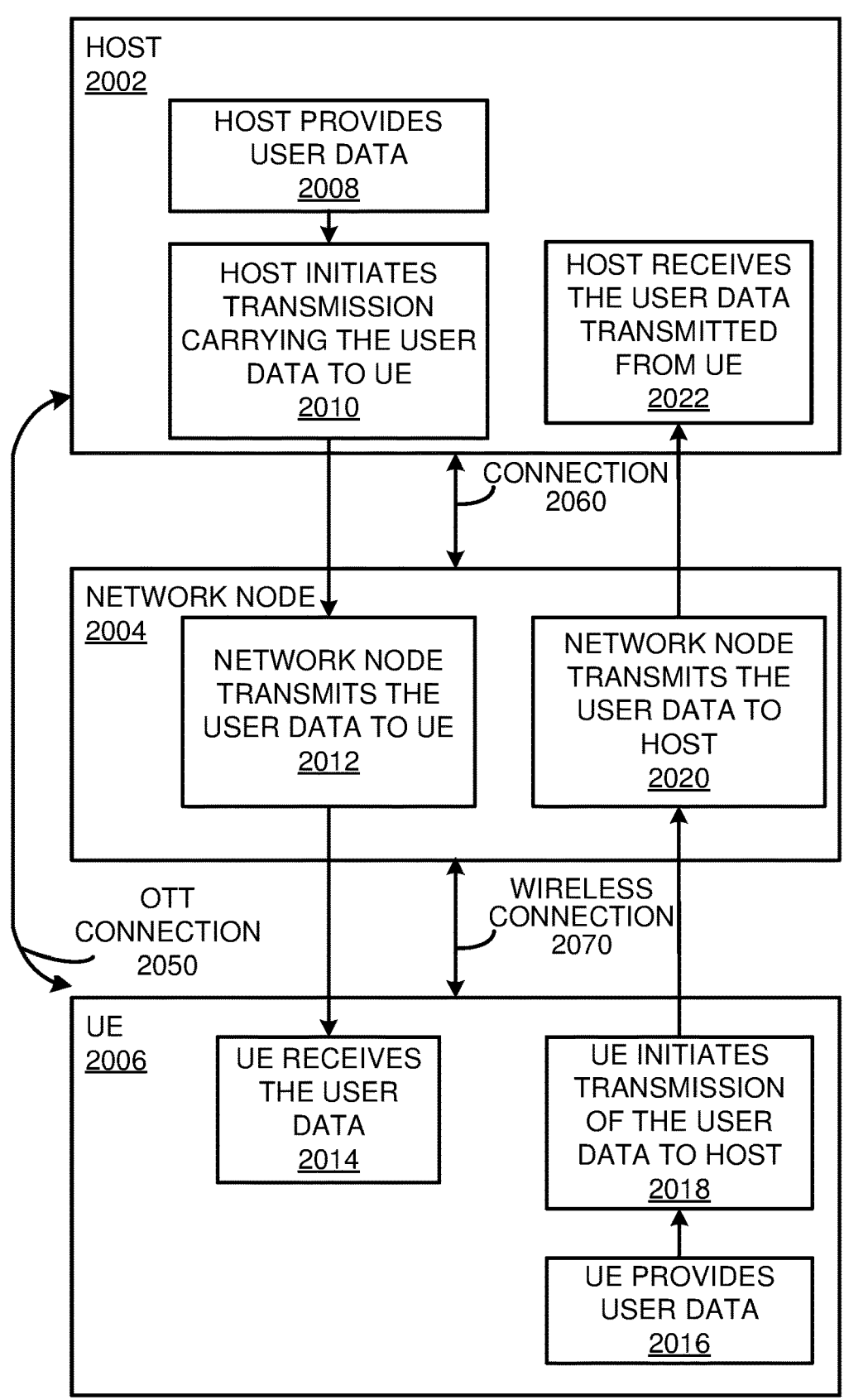
FIG. 20 is a block diagram of a host computer communicating via a base station with a user equipment over a partially wireless connection in accordance with some embodiments.

FIG. 20 shows a communication diagram of a host 2002 communicating via a network node 2004 with a UE 2006 over a partially wireless connection in accordance with some embodiments. Example implementations, in accordance with various embodiments, of the UE (such as a UE 1512*a* of FIG. 15 and/or UE 1600 of FIG. 16), network node (such as network node 1510*a* of FIG. 15 and/or network node 1700 of FIG. 17), and host (such as host 1516 of FIG. 15 and/or host 1800 of FIG. 18) discussed in the preceding paragraphs will now be described with reference to FIG. 20.

Like host 1800, embodiments of host 2002 include hardware, such as a communication interface, processing circuitry, and memory. The host 2002 also includes software, which is stored in or accessible by the host 2002 and executable by the processing circuitry. The software includes a host application that may be operable to provide a service to a remote user, such as the UE 2006 connecting via an over-the-top (OTT) connection 2050 extending between the UE 2006 and host 2002. In providing the service to the remote user, a host application may provide user data which is transmitted using the OTT connection 2050.

The network node 2004 includes hardware enabling it to communicate with the host 2002 and UE 2006. The connection 2060 may be direct or pass through a core network (like core network 1506 of FIG. 15) and/or one or more other intermediate networks, such as one or more public, private, or hosted networks. For example, an intermediate network may be a backbone network or the Internet.

The UE 2006 includes hardware and software, which is stored in or accessible by UE 2006 and executable by the UE's processing circuitry. The software includes a client application, such as a web browser or operator-specific "app" that may be operable to provide a service to a human or non-human user via UE 2006 with the support of the host 2002. In the host 2002, an executing host application may communicate with the executing client application via the OTT connection 2050 terminating at the UE 2006 and host 2002. In providing the service to the user, the UE's client application may receive request data from the host's host application and provide user data in response to the request data. The OTT connection 2050 may transfer both the request data and the user data. The UE's client application may interact with the user to generate the user data that it provides to the host application through the OTT connection 2050.

The OTT connection 2050 may extend via a connection 2060 between the host 2002 and the network node 2004 and via a wireless connection 2070 between the network node 2004 and the UE 2006 to provide the connection between the host 2002 and the UE 2006. The connection 2060 and wireless connection 2070, over which the OTT connection 2050 may be provided, have been drawn abstractly to illustrate the communication between the host 2002 and the UE 2006 via the network node 2004, without explicit reference to any intermediary devices and the precise routing of messages via these devices.

As an example of transmitting data via the OTT connection 2050, in step 2008, the host 2002 provides user data, which may be performed by executing a host application. In some embodiments, the user data is associated with a particular human user interacting with the UE 2006. In other embodiments, the user data is associated with a UE 2006 that shares data with the host 2002 without explicit human interaction. In step 2010, the host 2002 initiates a transmission carrying the user data towards the UE 2006. The host 2002 may initiate the transmission responsive to a request transmitted by the UE 2006. The request may be caused by human interaction with the UE 2006 or by operation of the client application executing on the UE 2006. The transmission may pass via the network node 2004, in accordance with the teachings of the embodiments described throughout this disclosure. Accordingly, in step 2012, the network node 2004 transmits to the UE 2006 the user data that was carried in the transmission that the host 2002 initiated, in accordance with the teachings of the embodiments described throughout this disclosure. In step 2014, the UE 2006 receives the user data carried in the transmission, which may be performed by a client application executed on the UE 2006 associated with the host application executed by the host 2002.

In some examples, the UE 2006 executes a client application which provides user data to the host 2002. The user data may be provided in reaction or response to the data received from the host 2002. Accordingly, in step 2016, the UE 2006 may provide user data, which may be performed by executing the client application. In providing the user data, the client application may further consider user input received from the user via an input/output interface of the UE 2006. Regardless of the specific manner in which the user data was provided, the UE 2006 initiates, in step 2018, transmission of the user data towards the host 2002 via the network node 2004. In step 2020, in accordance with the teachings of the embodiments described throughout this disclosure, the network node 2004 receives user data from the UE 2006 and initiates transmission of the received user data towards the host 2002. In step 2022, the host 2002 receives the user data carried in the transmission initiated by the UE 2006.

One or more of the various embodiments improve the performance of OTT services provided to the UE 2006 using the OTT connection 2050, in which the wireless connection 2070 forms the last segment.

In an example scenario, factory status information may be collected and analyzed by the host 2002. As another example, the host 2002 may process audio and video data which may have been retrieved from a UE for use in creating maps. As another example, the host 2002 may collect and analyze real-time data to assist in controlling vehicle congestion (e.g., controlling traffic lights). As another example, the host 2002 may store surveillance video uploaded by a UE. As another example, the host 2002 may store or control access to media content such as video, audio, VR or AR which it can broadcast, multicast or unicast to UEs. As other examples, the host 2002 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2050 between the host 2002 and UE 2006, in response to variations in the measurement results. The measurement procedure and/or the network functionality for reconfiguring the OTT connection may be implemented in software and hardware of the host 2002 and/or UE 2006. In some embodiments, sensors (not shown) may be deployed in or in association with other devices through which the OTT connection 2050 passes; the sensors may participate in the measurement procedure by supplying values of the monitored quantities exemplified above, or supplying values of other physical quantities from which software may compute or estimate the monitored quantities. The reconfiguring of the OTT connection 2050 may include message format, retransmission settings, preferred routing etc.; the reconfiguring need not directly alter the operation of the network node 2004. Such procedures and functionalities may be known and practiced in the art. In certain embodiments, measurements may involve proprietary UE signaling that facilitates measurements of throughput, propagation times, latency and the like, by the host 2002. The measurements may be implemented in that software causes messages to be transmitted, in particular empty or 'dummy' messages, using the OTT connection 2050 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows

EXEMPLARY EMBODIMENTS

Group A Embodiments

1. A method performed by a user equipment, UE, (800, 1512A, 1512B, 1512C, 1512D, 1600, 1904, 1908A, 1908B, 2006) for switching between a first state for beam management and a second state for beam management, the method comprising:

determining (1101) whether to change from the first state to the second state based on one or more first criteria while operating in the first state or determining whether to change from the second state to the first state based on one or more second criteria while operating in the second state;

responsive to determining (1103) to change from the first state to the second state:

changing (1105) the UE to operating in the second state; and performing (1107) at least one action in the second state; and responsive to determining (1109) to change from the second state to the first state: changing (1111) the UE to operating in the first state.

2. The method of Embodiment 1, further comprising sending (1113) an indication to a network node indicating whether the UE has changed from the first state to the second state or changed from the second state to the first state.

3. The method of any of Embodiments 1-2, wherein determining whether to change from the first state to the second state based on one or more first criteria comprises determining whether to change from the first state to the second state based on pre-defined criteria.

4. The method of any of Embodiments 1-3, wherein determining whether to change from the first state to the second state based on one or more first criteria comprises determining whether to change from the first state to the second state based on a timer expiring.

5. The method of any of Embodiments 1-4, wherein determining whether to change from the first state to the second state based on one or more first criteria comprises determining whether to change from the first state to the second state based on a position of the UE.

6. The method of Embodiment 5, wherein determining whether to change from the first state to the second state based on a position of the UE comprises determining whether to change from the first state to the second state based on a position of the UE between a first remote radio head, RRH, and a second RRH along a high speed train track.

7. The method of any of Embodiments 1-6, wherein determining whether to change from the first state to the second state based on one or more first criteria comprises determining whether to change from the first state to the second state based on a time over which a measured reference signal received power, RSRP, is below a RSRP threshold.

8. The method of any of Embodiments 1-6, wherein determining whether to change from the first state to the second state based on one or more first criteria comprises determining whether to change from the first state to the second state based on signal quality.

9. The method of any of Embodiments 1-7, wherein the UE operating in the first state performs beam sweeping with a first number of receive, RX, beams, the method further comprising performing beam sweeping with a second number of RX beams when operating in the second state.

10. The method of Embodiment 9 wherein the second number is greater than the first number.

11. The method of any of Embodiments 1-10, wherein performing the at least one action in the second state comprises implementing beam management enhancement to gain extra or wider angular or spherical coverage with increased or updated beam sweeping.

12. The method of Embodiment 11, wherein implementing the beam management enhancement comprises implementing the beam management enhancement responsive to at least one criteria being fulfilled.

13. The method of Embodiment 11, implementing the beam management enhancement comprises implementing beam management enhancement on at least one of synchronization signal and PBCH, physical broadcast channel, block, SSB, channel state information reference signals, CSI-RS, and a reference signal that is used for radio link monitoring, RLM, or beam failure detection, BFD.

14. The method of any of Embodiments 1-13, further comprising:

while operating in the first state, applying (1201) enhanced beam management during a cell change procedure; and reverting (1203) back to operating in the first state after the cell change procedure is completed.

15. The method of any of Embodiments 1-14, wherein determining whether to change from the second state to the first state based on one or more second criteria comprises determining whether to change from the second state to the first state based on a second timer expiring.

16. The method of Embodiment 15, wherein determining whether to change from the second state to the first state based on one or more second criteria comprises determining whether to change from the second state to the first state based on the second timer expiring and at least one condition or criteria being met.

17. The method of any of Embodiments 1-14, wherein determining whether to change from the second state to the first state based on one or more second criteria comprises determining whether to change from the second state to the first state based on at least one condition or criteria being met.

18. The method of any of Embodiments 1-17, wherein determining whether to change from the second state to the first state based on one or more second criteria comprises determining to change from the second state to the first state based on one or more radio link procedures, RLP, being triggered.

19. The method of Embodiment 18 wherein the one or more RLPs are one or more pre-defined RLPs.

20. The method of Embodiment 18 wherein the one or more RLPs are configured by a network node.

21. The method of any of Embodiments 16-20 wherein determining whether to change from the second state to the first state based on one or more second criteria comprises determining whether to change from the second state to the first state based on a position of the UE.

22. The method of Embodiment 21, wherein determining whether to change from the second state to the first state based on a position of the UE comprises determining whether to change from the second state to the first state based on a position of the UE between a first remote radio head, RRH, and a second RRH along a high speed train track.

23. The method of any of Embodiments 16-20, wherein determining whether to change from the second state to the first state based on one or more second criteria comprises determining whether to change from the second state to the first state based on a time over which a measured reference signal received power, RSRP, is equal to or above a RSRP threshold.

24. The method of any of Embodiments 16-20, wherein determining whether to change from the second state to the first state based on one or more second criteria comprises determining whether to change from the second state to the first state based on signal quality.

25. The method of any of Embodiments 1-24, further comprising:

responsive to receiving a command to change to the second state while operating in the first state, changing (1301) from the first state to the second state; and responsive to receiving a command to change to the first state while operating in the second state, changing (1303) from the second state to the first state.

26. The method of any of the previous embodiments, further comprising:

providing user data; and forwarding the user data to a host via the transmission to the network node.

Group B Embodiments

27. A method performed by a network node (900, 1510A, 1510B, 1700, 1904, 1908A, 1908B, 2004) for performing tasks based on a user equipment, UE, switching between a first state for beam management and a second state for beam management, the method comprising:

receiving (1401) information from a user equipment, UE, indicating that the UE has switched from a first state for beam management to a second state for beam management or from the second state to the first state; and responsive to receiving the information, performing (1403) one or more tasks based on whether the UE has switched from the first state to the second state or from the second state to the first state.

28. The method of Embodiment 27, wherein performing the one or more tasks comprises changing a transmit, TC, beam responsive to determining that a transmit, TC, beam needs to be changed.

29. The method of any of Embodiments 27-28, wherein performing the one or more tasks comprises triggering one or more procedures or tasks for the UE to perform.

30. The method of Embodiment 29, wherein the one or more procedures or tasks comprises one or more of transmission configuration indication, TCI, state switching, a cell change to a target cell, and a cell change to a target cell only when the UE has switched from the first state to the second state.

31. The method of any of Embodiments 27-29, wherein the network node has knowledge of a train track layout and that for some proportion of the track, a remote radio head, RRH beam coverage will be more spatially diverse and the UE will need to enter the enhanced mode, performing the one or more tasks comprises signalling to the UE that the UE must enter or must leave a beam management enhancement operation.

31. The method of any of the previous embodiments, further comprising:

obtaining user data; and forwarding the user data to a host or a user equipment.

Group C Embodiments

32. A user equipment, UE, (800, 1512A, 1512B, 1512C, 1512D, 1600, 1904, 1908A, 1908B, 2006) for switching between a first state for beam management and a second state for beam management, comprising:

processing circuitry configured to perform any of the steps of any of the Group A embodiments; and power supply circuitry configured to supply power to the processing circuitry.

33. A network node (900, 1510A, 1510B, 1700, 1904, 1908A, 1908B, 2004) for performing tasks based on a user equipment, UE, switching between a first state for beam management and a second state for beam management, the network node comprising:

processing circuitry configured to perform any of the steps of any of the Group B embodiments;

power supply circuitry configured to supply power to the processing circuitry.

34. A user equipment, UE, (800, 1512A, 1512B, 1512C, 1512D, 1600, 1904, 1908A, 1908B, 2006) for switching between a first state for beam management and a second state for beam management, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

35. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to receive the user data from the host.

36. The host of the previous embodiment, wherein the cellular network further includes a network node configured to communicate with the UE to transmit the user data to the UE from the host.

37. The host of the previous 2 embodiments, wherein:

the processing circuitry of the host is configured to execute a host application, thereby providing the user data; and the host application is configured to interact with a client application executing on the UE, the client application being associated with the host application.

38. A method implemented by a host operating in a communication system that further includes a network node and a user equipment (UE), the method comprising:

providing user data for the UE; and initiating a transmission carrying the user data to the UE via a cellular network comprising the network node, wherein the UE performs any of the operations of any of the Group A embodiments to receive the user data from the host.

39. The method of the previous embodiment, further comprising:

at the host, executing a host application associated with a client application executing on the UE to receive the user data from the UE.

40. The method of the previous embodiment, further comprising:

at the host, transmitting input data to the client application executing on the UE, the input data being provided by executing the host application, wherein the user data is provided by the client application in response to the input data from the host application.

41. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to transmit the user data to the host.

42. The host of the previous embodiment, wherein the cellular network further includes a network node configured to communicate with the UE to transmit the user data from the UE to the host.

43. The host of the previous 2 embodiments, wherein:

the processing circuitry of the host is configured to execute a host application, thereby providing the user data; and the host application is configured to interact with a client application executing on the UE, the client application being associated with the host application.

44. A method implemented by a host configured to operate in a communication system that further includes a network node and a user equipment (UE), the method comprising:

at the host, receiving user data transmitted to the host via the network node by the UE, wherein the UE performs any of the steps of any of the Group A embodiments to transmit the user data to the host.

45. The method of the previous embodiment, further comprising:

at the host, executing a host application associated with a client application executing on the UE to receive the user data from the UE.

46. The method of the previous embodiment, further comprising:

at the host, transmitting input data to the client application executing on the UE, the input data being provided by executing the host application, wherein the user data is provided by the client application in response to the input data from the host application.

47. A host configured to operate in a communication system to provide an over-the-top (OTT) service, the host comprising:

processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.

48. The host of the previous embodiment, wherein:

the processing circuitry of the host is configured to execute a host application that provides the user data; and the UE comprises processing circuitry configured to execute a client application associated with the host application to receive the transmission of user data from the host.

49. A method implemented in a host configured to operate in a communication system that further includes a network node and a user equipment (UE), the method comprising:

providing user data for the UE; and initiating a transmission carrying the user data to the UE via a cellular network comprising the network node, wherein the network node performs any of the operations of any of the Group B embodiments to transmit the user data from the host to the UE.

50. The method of the previous embodiment, further comprising, at the network node, transmitting the user data provided by the host for the UE.

51. The method of any of the previous 2 embodiments, wherein the user data is provided at the host by executing a host application that interacts with a client application executing on the UE, the client application being associated with the host application.

52. A communication system configured to provide an over-the-top service, the communication system comprising:

a host comprising:

processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.

53. The communication system of the previous embodiment, further comprising:

the network node; and/or the user equipment.

54. A host configured to operate in a communication system to provide an over-the-top (OTT) service, the host comprising:

processing circuitry configured to initiate receipt of user data; and a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.

55. The host of the previous 2 embodiments, wherein:

the processing circuitry of the host is configured to execute a host application, thereby providing the user data; and the host application is configured to interact with a client application executing on the UE, the client application being associated with the host application.

56. The host of the any of the previous 2 embodiments, wherein the initiating receipt of the user data comprises requesting the user data.

57. A method implemented by a host configured to operate in a communication system that further includes a network node and a user equipment (UE), the method comprising:

at the host, initiating receipt of user data from the UE, the user data originating from a transmission which the network node has received from the UE, wherein the network node performs any of the steps of any of the Group B embodiments to receive the user data from the UE for the host.

58. The method of the previous embodiment, further comprising at the network node, transmitting the received user data to the host.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a user equipment (UE) for switching between a first state for beam management and a second state for beam management, the method comprising:

determining whether to change from the first state to the second state based on one or more first criteria while operating in the first state or determining whether to change from the second state to the first state based on one or more second criteria while operating in the second state;

responsive to determining to change from the first state to the second state:

sending an indication to a network node indicating whether the UE has changed from the first state to the second state or changed from the second state to the first state;

changing the UE to operating in the second state;

performing at least one action in the second state; and responsive to determining to change from the second state to the first state:

changing the UE to operating in the first state.

2. The method of claim 1, wherein determining whether to change from the first state to the second state based on one or more first criteria comprises:

determining whether to change from the first state to the second state based on pre-defined criteria;

determining whether to change from the first state to the second state based on a timer expiring;

determining whether to change from the first state to the second state based on a position of the UE;

determining whether to change from the first state to the second state based on a position of the UE between a first remote radio head (RRH) and a second RRH along a high speed train track; or determining whether to change from the first state to the second state based on a time over which a measured reference signal received power (RSRP) is below a RSRP threshold.

3. The method of claim 1, wherein determining whether to change from the first state to the second state based on one or more first criteria comprises determining whether to change from the first state to the second state based on signal quality.

4. The method of claim 1, wherein performing the at least one action in the second state comprises implementing beam management enhancement to gain extra or wider angular or spherical coverage with increased or updated beam sweeping.

5. The method of claim 4, wherein implementing the beam management enhancement comprises implementing beam management enhancement on at least one of synchronization signal and PBCH, physical broadcast channel, block, SSB, channel state information reference signals (CSI-RS) and a reference signal that is used for radio link monitoring (RLM) or beam failure detection (BFDU).

6. The method of claim 1, further comprising:
while operating in the first state, applying enhanced beam management during a cell change procedure; and
reverting back to operating in the first state after the cell change procedure is completed.

7. The method of claim 1, wherein determining whether to change from the second state to the first state based on one or more second criteria comprises:
determining whether to change from the second state to the first state based on a second timer expiring;
determining whether to change from the second state to the first state based on the second timer expiring and at least one condition or criteria being met;
determining whether to change from the second state to the first state based on at least one condition or criteria being met; or
determining to change from the second state to the first state based on one or more radio link procedures (RLP) being triggered.

8. The method of claim 7 wherein the one or more RLPs are one or more pre-defined RLPs.

9. The method of claim 8 wherein the one or more RLPs are configured by a network node.

10. The method of claim 1 wherein determining whether to change from the second state to the first state based on one or more second criteria comprises determining whether to change from the second state to the first state based on a position of the UE.

11. The method of claim 10, wherein determining whether to change from the second state to the first state based on a position of the UE comprises determining whether to change from the second state to the first state based on a position of the UE between a first remote radio head (RRH) and a second RRH along a high speed train track.

12. The method of claim 1, wherein determining whether to change from the second state to the first state based on one or more second criteria comprises determining whether to change from the second state to the first state based on a time over which a measured reference signal received power (RSRP) is equal to or above a RSRP threshold.

13. The method of claim 1, wherein determining whether to change from the second state to the first state based on one or more second criteria comprises determining whether to change from the second state to the first state based on signal quality.

14. The method of claim 1, further comprising:
responsive to receiving a command to change to the second state while operating in the first state, changing from the first state to the second state; and
responsive to receiving a command to change to the first state while operating in the second state, changing from the second state to the first state.

15. A method performed by a user equipment (UE) for switching between a first state for beam management and a second state for beam management, the method comprising:
determining whether to change from the first state to the second state based on one or more first criteria while operating in the first state or determining whether to change from the second state to the first state based on one or more second criteria while operating in the second state;
responsive to determining to change from the first state to the second state:
changing the UE to operating in the second state;
performing at least one action in the second state; and
responsive to determining to change from the second state to the first state:
changing the UE to operating in the first state, wherein the UE operating in the first state performs beam sweeping with a first number of receive (RX) beams, the method further comprising performing beam sweeping with a second number of RX beams when operating in the second state.

16. The method of claim 15 wherein the second number is greater than the first number.

17. A method performed by a network node for performing tasks based on a user equipment (UE) switching between a first state for beam management and a second state for beam management, the method comprising:
receiving information from the UE indicating that the UE has switched from a first state for beam management to a second state for beam management or from the second state to the first state; and
responsive to receiving the information, performing one or more tasks based on whether the UE has switched from the first state to the second state or from the second state to the first state.

18. The method of claim 17, wherein performing the one or more tasks comprises changing a transmit beam responsive to determining that the transmit beam needs to be changed.

19. The method of claim 17, wherein performing the one or more tasks comprises triggering one or more procedures or tasks for the UE to perform.

20. The method of claim 19, wherein the one or more procedures or tasks comprises one or more of transmission configuration indication (TCI) state switching, a cell change to a target cell, and a cell change to a target cell only when the UE has switched from the first state to the second state.

21. The method of claim 17, wherein the network node has knowledge of a train track layout and that for some proportion of the track, a remote radio head, RRH beam coverage will be more spatially diverse and the UE will need to enter the enhanced mode, performing the one or more tasks comprises signalling to the UE that the UE must enter or must leave a beam management enhancement operation.

* * * * *